(12) United States Patent
Akutagawa et al.

(10) Patent No.: US 8,879,582 B2
(45) Date of Patent: Nov. 4, 2014

(54) TRANSMITTER AND TRANSMISSION METHOD

(75) Inventors: Hiroyuki Akutagawa, Tokyo (JP); Takehiko Kobayashi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 162 days.

(21) Appl. No.: 13/638,657

(22) PCT Filed: Apr. 6, 2011

(86) PCT No.: PCT/JP2011/002049
§ 371 (c)(1),
(2), (4) Date: Oct. 1, 2012

(87) PCT Pub. No.: WO2011/125329
PCT Pub. Date: Oct. 13, 2011

(65) Prior Publication Data
US 2013/0022058 A1   Jan. 24, 2013

(30) Foreign Application Priority Data
Apr. 7, 2010  (JP) ................................. 2010-088918

(51) Int. Cl.
*H04L 12/56* (2006.01)
*H04L 7/04* (2006.01)

(52) U.S. Cl.
CPC ...................................... *H04L 7/041* (2013.01)
USPC ....................................................... 370/476

(58) Field of Classification Search
USPC ....................................................... 370/476
See application file for complete search history.

(56) References Cited

U.S. PATENT DOCUMENTS

| 7,408,912 | B2 * | 8/2008 | Kasamura | 370/345 |
| 7,567,623 | B2 * | 7/2009 | Nam et al. | 375/296 |
| 7,773,699 | B2 * | 8/2010 | Jia et al. | 375/341 |

(Continued)

FOREIGN PATENT DOCUMENTS

| CA | 2432215 C | * | 1/2013 |
| JP | 2000-59329 | | 2/2000 |
| JP | 2007-13488 | | 1/2007 |
| JP | 2009-303086 | | 12/2009 |

OTHER PUBLICATIONS

Manav R. Bhatnagar, Are Hjørungnes, and Lingyang Song, Double-Differential Coding for Orthogonal Space-Time Block Codes, 1-4244-1484-9/08/$25.00 © 2008 IEEE.*

(Continued)

*Primary Examiner* — Mark Rinehart
*Assistant Examiner* — Peter Solinsky
(74) *Attorney, Agent, or Firm* — Wenderoth, Lind & Ponack, LLP

(57) ABSTRACT

In a transmitter which transmits a signal by a DSTBC scheme, communication is efficiently performed by the DSTBC scheme. In the transmitter which transmits the signal by the DSTBC scheme, a frame in which a sync word is disposed in a predetermined position subsequent to the head is used. Initial value controller (31 to 35) sets initial values of differential encoding (differential encoding unit 15) when a DSTBC encoder which processes a transmission target processes the frame on the basis of values from the head of the frame to a position before the sync word so that a signal point corresponding to the position immediately before the sync word in the DSTBC encoder which processes the transmission target becomes a specific point.

5 Claims, 17 Drawing Sheets

(56) References Cited

U.S. PATENT DOCUMENTS

| | | | | |
|---|---|---|---|---|
| 2005/0063483 A1* | 3/2005 | Wang et al. | | 375/267 |
| 2007/0082624 A1* | 4/2007 | Jung et al. | | 455/101 |
| 2007/0286312 A1* | 12/2007 | Kim | | 375/340 |

OTHER PUBLICATIONS

Vahid Tarokh, Member, IEEE, and Hamid Jafarkhani, Member, IEEE, A Differential Detection Scheme for Transmit Diversity, IEEE Journal on Selected Areas in Communications, vol. 18, No. 7, Jul. 2000.*

Chan-Soo Hwang, Member, IEEE, Seung Hoon Nam, Jaehak Chung, Senior Member, IEEE, and Vahid Tarokh, Member, IEEE, Differential Space Time Block Codes Using Nonconstant Modulus Constellations, IEEE Transactions on Signal Processing, vol. 51, No. 11, Nov. 2003.*

Modulation and Coding Techniques in Wireless Communications, Wiley Publishing.*

International Search Report issued May 17, 2011 in International (PCT) Application No. PCT/JP2011/002049.

"Macro-Diversity Scheme for a Point-to-Multipoint Communication System by means of D-STBC Method in Fast Fading Environment", Subrata Kumar Biswas, Tetsuki Taniguchi, Members, and Yoshio Karasawa, Fellow, IEICE Trans. Commun., vol. E92-B, No. 6, Jun. 2009.

* cited by examiner

OUTPUT EXAMPLE OF INITIAL VALUE UPDATING UNIT

| OUTPUT IMMEDIATELY BEFORE SYNC WORD OF THE FIRST STAGE DIFFERENTIAL ENCODING UNIT (INPUT OF INITIAL VALUE UPDATING UNIT) | | | INITIAL VALUES S-2 AND S-1 OF THE SECOND STAGE DIFFERENTIAL ENCODING UNIT (OUTPUT OF INITIAL VALUE UPDATING UNIT) | | |
|---|---|---|---|---|---|
| STATE No. | $S'_{58}$ | $S'_{59}$ | STATE No. | $S_{-2}$ | $S_{-1}$ |
| 1 | [1] | [13] | 1 | [1] | [13] |
| 2 | [1] | [18] | 15 | [11] | [6] |
| 3 | [2] | [15] | 8 | [4] | [19] |
| 4 | [2] | [20] | 12 | [8] | [10] |
| 5 | [3] | [14] | 13 | [9] | [8] |
| 6 | [3] | [17] | 6 | [3] | [17] |
| 7 | [4] | [16] | 10 | [6] | [12] |
| 8 | [4] | [19] | 3 | [2] | [15] |
| 9 | [5] | [11] | 21 | [17] | [4] |
| 10 | [6] | [12] | 7 | [4] | [16] |
| 11 | [7] | [9] | 17 | [13] | [2] |
| 12 | [8] | [10] | 4 | [2] | [20] |
| 13 | [9] | [8] | 5 | [3] | [14] |
| 14 | [10] | [5] | 23 | [19] | [1] |
| 15 | [11] | [6] | 2 | [1] | [18] |
| 16 | [12] | [7] | 19 | [15] | [3] |
| 17 | [13] | [2] | 11 | [7] | [9] |
| 18 | [14] | [4] | 22 | [18] | [2] |
| 19 | [15] | [3] | 16 | [12] | [7] |
| 20 | [16] | [1] | 24 | [20] | [3] |
| 21 | [17] | [4] | 9 | [5] | [11] |
| 22 | [18] | [2] | 18 | [14] | [4] |
| 23 | [19] | [1] | 14 | [10] | [5] |
| 24 | [20] | [3] | 20 | [16] | [1] |

FIG.3

SIMULATION RESULT (CASE 1-1)

INITIAL VALUE: (FORMULA 6)  
INITIAL VALUE: SET BY CONVERSION TABLE

| | m | INPUT PATTERN 1 | $S'_{2m}$ | $S'_{2m+1}$ | STATE No. | | $S_{2m}$ | $S_{2m+1}$ | STATE No. | |
|---|---|---|---|---|---|---|---|---|---|---|
| | | | $S'_{-2}$ | $S'_{-1}$ | 1 | | $S_{-2}$ | $S_{-1}$ | 12 | |
| | 0 | 0001 | $S'_0$ | $S'_1$ | 2 | | $S_0$ | $S_1$ | 8 | |
| | 1 | 0111 | $S'_2$ | $S'_3$ | 18 | | $S_2$ | $S_3$ | 13 | |
| | 2 | 1001 | $S'_4$ | $S'_5$ | 19 | | $S_4$ | $S_5$ | 18 | |
| | 3 | 0111 | $S'_6$ | $S'_7$ | 24 | | $S_6$ | $S_7$ | 16 | |
| | 4 | 0001 | $S'_8$ | $S'_9$ | 21 | | $S_8$ | $S_9$ | 20 | |
| | 5 | 0101 | $S'_{10}$ | $S'_{11}$ | 20 | | $S_{10}$ | $S_{11}$ | 14 | |
| R, P, TCH RANDOM BIT | 6 | 0100 | $S'_{12}$ | $S'_{13}$ | 21 | | $S_{12}$ | $S_{13}$ | 20 | |
| | 7 | 1100 | $S'_{14}$ | $S'_{15}$ | 15 | | $S_{14}$ | $S_{15}$ | 19 | |
| | 8 | 1110 | $S'_{16}$ | $S'_{17}$ | 24 | | $S_{16}$ | $S_{17}$ | 16 | |
| | 9 | 1001 | $S'_{18}$ | $S'_{19}$ | 15 | | $S_{18}$ | $S_{19}$ | 19 | |
| | 10 | 1010 | $S'_{20}$ | $S'_{21}$ | 20 | | $S_{20}$ | $S_{21}$ | 14 | |
| | 11 | 0110 | $S'_{22}$ | $S'_{23}$ | 13 | | $S_{22}$ | $S_{23}$ | 23 | |
| | 12 | 0111 | $S'_{24}$ | $S'_{25}$ | 18 | | $S_{24}$ | $S_{25}$ | 13 | |
| | 13 | 0010 | $S'_{26}$ | $S'_{27}$ | 2 | | $S_{26}$ | $S_{27}$ | 8 | |
| | 14 | 0010 | $S'_{28}$ | $S'_{29}$ | 20 | | $S_{28}$ | $S_{29}$ | 14 | |
| | 15 | 0010 | $S'_{30}$ | $S'_{31}$ | 13 | | $S_{30}$ | $S_{31}$ | 23 | |
| | 16 | 1111 | $S'_{32}$ | $S'_{33}$ | 4 | | $S_{32}$ | $S_{33}$ | 1 | |
| | 17 | 1011 | $S'_{34}$ | $S'_{35}$ | 6 | | $S_{34}$ | $S_{35}$ | 10 | |
| | 18 | 0101 | $S'_{36}$ | $S'_{37}$ | 2 | | $S_{36}$ | $S_{37}$ | 8 | |
| | 19 | 1011 | $S'_{38}$ | $S'_{39}$ | 12 | | $S_{38}$ | $S_{39}$ | 7 | |
| | 20 | 0001 | $S'_{40}$ | $S'_{41}$ | 18 | | $S_{40}$ | $S_{41}$ | 13 | |
| | 21 | 1101 | $S'_{42}$ | $S'_{43}$ | 15 | | $S_{42}$ | $S_{43}$ | 19 | |
| | 22 | 0010 | $S'_{44}$ | $S'_{45}$ | 2 | | $S_{44}$ | $S_{45}$ | 8 | |
| | 23 | 0110 | $S'_{46}$ | $S'_{47}$ | 11 | | $S_{46}$ | $S_{47}$ | 5 | |
| | 24 | 0000 | $S'_{48}$ | $S'_{49}$ | 22 | | $S_{48}$ | $S_{49}$ | 15 | |
| | 25 | 1011 | $S'_{50}$ | $S'_{51}$ | 19 | | $S_{50}$ | $S_{51}$ | 18 | |
| | 26 | 1000 | $S'_{52}$ | $S'_{53}$ | 6 | | $S_{52}$ | $S_{53}$ | 10 | |
| | 27 | 1010 | $S'_{54}$ | $S'_{55}$ | 23 | | $S_{54}$ | $S_{55}$ | 22 | |
| | 28 | 1101 | $S'_{56}$ | $S'_{57}$ | 14 | | $S_{56}$ | $S_{57}$ | 17 | |
| | 29 | 0010 | $S'_{58}$ | $S'_{59}$ | 4 | | $S_{58}$ | $S_{59}$ | 1 | ← BECOMES STATE No. 1 IMMEDIATELY BEFORE SW |
| SW FIXED BIT | 30 | 1000 | $S'_{60}$ | $S'_{61}$ | 8 | | $S_{60}$ | $S_{61}$ | 11 | |
| | 31 | 0001 | $S'_{62}$ | $S'_{63}$ | 13 | | $S_{62}$ | $S_{63}$ | 23 | |
| | 32 | 1101 | $S'_{64}$ | $S'_{65}$ | 7 | | $S_{64}$ | $S_{65}$ | 6 | SW MAPPING PATTERN IS FIXED |
| | 33 | 0111 | $S'_{66}$ | $S'_{67}$ | 8 | | $S_{66}$ | $S_{67}$ | 11 | |
| | 34 | 0101 | $S'_{68}$ | $S'_{69}$ | 17 | | $S_{68}$ | $S_{69}$ | 24 | |
| | | ... | | | | | | | | |

FIG.4

SIMULATION RESULT (CASE 1-2)

INITIAL VALUE: (FORMULA 6)
INITIAL VALUE: SET BY CONVERSION TABLE

| | m | INPUT PATTERN 2 | $S'_{2m}$ | $S'_{2m+1}$ | STATE No. | | $S_{2m}$ | $S_{2m+1}$ | STATE No. | |
|---|---|---|---|---|---|---|---|---|---|---|
| | | | $S'_{-2}$ | $S'_{-1}$ | 1 | ← | $S_{-2}$ | $S_{-1}$ | 20 | ← |
| R, P, TCH RANDOM BIT | 0 | 0111 | $S'_0$ | $S'_1$ | 9 | | $S_0$ | $S_1$ | 12 | |
| | 1 | 0100 | $S'_2$ | $S'_3$ | 4 | | $S_2$ | $S_3$ | 19 | |
| | 2 | 1000 | $S'_4$ | $S'_5$ | 8 | | $S_4$ | $S_5$ | 18 | |
| | 3 | 0010 | $S'_6$ | $S'_7$ | 11 | | $S_6$ | $S_7$ | 10 | |
| | 4 | 1010 | $S'_8$ | $S'_9$ | 20 | | $S_8$ | $S_9$ | 6 | |
| | 5 | 1110 | $S'_{10}$ | $S'_{11}$ | 9 | | $S_{10}$ | $S_{11}$ | 12 | |
| | 6 | 1010 | $S'_{12}$ | $S'_{13}$ | 24 | | $S_{12}$ | $S_{13}$ | 1 | |
| | 7 | 0100 | $S'_{14}$ | $S'_{15}$ | 14 | | $S_{14}$ | $S_{15}$ | 15 | |
| | 8 | 1010 | $S'_{16}$ | $S'_{17}$ | 18 | | $S_{16}$ | $S_{17}$ | 3 | |
| | 9 | 1000 | $S'_{18}$ | $S'_{19}$ | 13 | | $S_{18}$ | $S_{19}$ | 14 | |
| | 10 | 0110 | $S'_{20}$ | $S'_{21}$ | 20 | | $S_{20}$ | $S_{21}$ | 6 | |
| | 11 | 1110 | $S'_{22}$ | $S'_{23}$ | 9 | | $S_{22}$ | $S_{23}$ | 12 | |
| | 12 | 1011 | $S'_{24}$ | $S'_{25}$ | 7 | | $S_{24}$ | $S_{25}$ | 23 | |
| | 13 | 1101 | $S'_{26}$ | $S'_{27}$ | 20 | | $S_{26}$ | $S_{27}$ | 6 | |
| | 14 | 1000 | $S'_{28}$ | $S'_{29}$ | 10 | | $S_{28}$ | $S_{29}$ | 9 | |
| | 15 | 1001 | $S'_{30}$ | $S'_{31}$ | 18 | | $S_{30}$ | $S_{31}$ | 3 | |
| | 16 | 0010 | $S'_{32}$ | $S'_{33}$ | 10 | | $S_{32}$ | $S_{33}$ | 9 | |
| | 17 | 0100 | $S'_{34}$ | $S'_{35}$ | 23 | | $S_{34}$ | $S_{35}$ | 4 | |
| | 18 | 0110 | $S'_{36}$ | $S'_{37}$ | 14 | | $S_{36}$ | $S_{37}$ | 15 | |
| | 19 | 0110 | $S'_{38}$ | $S'_{39}$ | 6 | | $S_{38}$ | $S_{39}$ | 24 | |
| | 20 | 1100 | $S'_{40}$ | $S'_{41}$ | 17 | | $S_{40}$ | $S_{41}$ | 5 | |
| | 21 | 0101 | $S'_{42}$ | $S'_{43}$ | 15 | | $S_{42}$ | $S_{43}$ | 16 | |
| | 22 | 1111 | $S'_{44}$ | $S'_{45}$ | 1 | | $S_{44}$ | $S_{45}$ | 20 | |
| | 23 | 0011 | $S'_{46}$ | $S'_{47}$ | 17 | | $S_{46}$ | $S_{47}$ | 5 | |
| | 24 | 0000 | $S'_{48}$ | $S'_{49}$ | 14 | | $S_{48}$ | $S_{49}$ | 15 | |
| | 25 | 0000 | $S'_{50}$ | $S'_{51}$ | 20 | | $S_{50}$ | $S_{51}$ | 6 | |
| | 26 | 1001 | $S'_{52}$ | $S'_{53}$ | 4 | | $S_{52}$ | $S_{53}$ | 19 | |
| | 27 | 1000 | $S'_{54}$ | $S'_{55}$ | 8 | | $S_{54}$ | $S_{55}$ | 18 | |
| | 28 | 0001 | $S'_{56}$ | $S'_{57}$ | 13 | | $S_{56}$ | $S_{57}$ | 14 | |
| | 29 | 1001 | $S'_{58}$ | $S'_{59}$ | 24 | | $S_{58}$ | $S_{59}$ | 1 | ← BECOMES STATE No. 1 IMMEDIATELY BEFORE SW |
| SW FIXED BIT | 30 | 1000 | $S'_{60}$ | $S'_{61}$ | 12 | | $S_{60}$ | $S_{61}$ | 11 | |
| | 31 | 0001 | $S'_{62}$ | $S'_{63}$ | 7 | | $S_{62}$ | $S_{63}$ | 23 | SW MAPPING PATTERN IS FIXED |
| | 32 | 1101 | $S'_{64}$ | $S'_{65}$ | 20 | | $S_{64}$ | $S_{65}$ | 6 | |
| | 33 | 0111 | $S'_{66}$ | $S'_{67}$ | 12 | | $S_{66}$ | $S_{67}$ | 11 | |
| | 34 | 0101 | $S'_{68}$ | $S'_{69}$ | 6 | | $S_{68}$ | $S_{69}$ | 24 | |
| | ... | | | | | | | | | |

FIG.5

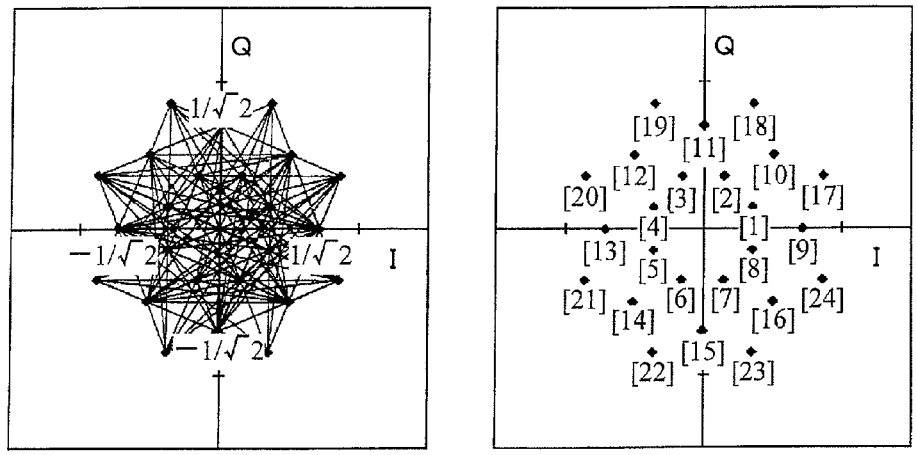

COORDINATES OF 24 POINTS $S = \sin(\pi/8)\{\cos(\pi/8)+j \cdot \sin(\pi/8)\}$ $S = \sin(\pi/8)\{\cos(3\pi/8)+j \cdot \sin(3\pi/8)\}$ $S = \sin(\pi/8)\{\cos(5\pi/8)+j \cdot \sin(5\pi/8)\}$ $S = \sin(\pi/8)\{\cos(7\pi/8)+j \cdot \sin(7\pi/8)\}$ $S = \sin(\pi/8)\{\cos(9\pi/8)+j \cdot \sin(9\pi/8)\}$ $S = \sin(\pi/8)\{\cos(11\pi/8)+j \cdot \sin(11\pi/8)\}$ $S = \sin(\pi/8)\{\cos(13\pi/8)+j \cdot \sin(13\pi/8)\}$ $S = \sin(\pi/8)\{\cos(15\pi/8)+j \cdot \sin(15\pi/8)\}$ $S = \sin(\pi/4)\{\cos(0)+j \cdot \sin(0)\}$ $S = \sin(\pi/4)\{\cos(\pi/4)+j \cdot \sin(\pi/4)\}$ $S = \sin(\pi/4)\{\cos(\pi/2)+j \cdot \sin(\pi/2)\}$ $S = \sin(\pi/4)\{\cos(3\pi/4)+j \cdot \sin(3\pi/4)\}$ $S = \sin(\pi/4)\{\cos(\pi)+j \cdot \sin(\pi)\}$ $S = \sin(\pi/4)\{\cos(5\pi/4)+j \cdot \sin(5\pi/4)\}$ $S = \sin(\pi/4)\{\cos(3\pi/2)+j \cdot \sin(3\pi/2)\}$ $S = \sin(\pi/4)\{\cos(7\pi/4)+j \cdot \sin(7\pi/4)\}$ $S = \sin(3\pi/8)\{\cos(\pi/8)+j \cdot \sin(\pi/8)\}$ $S = \sin(3\pi/8)\{\cos(3\pi/8)+j \cdot \sin(3\pi/8)\}$ $S = \sin(3\pi/8)\{\cos(5\pi/8)+j \cdot \sin(5\pi/8)\}$ $S = \sin(3\pi/8)\{\cos(7\pi/8)+j \cdot \sin(7\pi/8)\}$ $S = \sin(3\pi/8)\{\cos(9\pi/8)+j \cdot \sin(9\pi/8)\}$ $S = \sin(3\pi/8)\{\cos(11\pi/8)+j \cdot \sin(11\pi/8)\}$ $S = \sin(3\pi/8)\{\cos(13\pi/8)+j \cdot \sin(13\pi/8)\}$ $S = \sin(3\pi/8)\{\cos(15\pi/8)+j \cdot \sin(15\pi/8)\}$

J BECOMES IMAGINARY NUMBER UNIT

FIG.6

| STATE No. | $S_{2m}$ | $S_{2m+1}$ |
|---|---|---|
| 1 | [1] | [17] |
| 2 | [2] | [22] |
| 3 | [3] | [19] |
| 4 | [4] | [24] |
| 5 | [5] | [21] |
| 6 | [6] | [18] |
| 7 | [7] | [23] |
| 8 | [8] | [20] |
| 9 | [9] | [11] |
| 10 | [10] | [16] |
| 11 | [11] | [13] |
| 12 | [12] | [10] |
| 13 | [13] | [15] |
| 14 | [14] | [12] |
| 15 | [15] | [9] |
| 16 | [16] | [14] |
| 17 | [17] | [5] |
| 18 | [18] | [2] |
| 19 | [19] | [7] |
| 20 | [20] | [4] |
| 21 | [21] | [1] |
| 22 | [22] | [6] |
| 23 | [23] | [3] |
| 24 | [24] | [8] |

[1] TO [24] REPRESENT MAPPING POINT NUMBERS.

OUTPUT EXAMPLE OF INITIAL VALUE UPDATING UNIT

| OUTPUT IMMEDIATELY BEFORE SYNC WORD OF THE FIRST STAGE DIFFERENTIAL ENCODING UNIT (INPUT OF INITIAL VALUE UPDATING UNIT) | | | INITIAL VALUES S-2 AND S-1 OF THE SECOND STAGE DIFFERENTIAL ENCODING UNIT (OUTPUT OF INITIAL VALUE UPDATING UNIT) | | |
|---|---|---|---|---|---|
| STATE No. | $S'_{58}$ | $S'_{59}$ | STATE No. | $S_{-2}$ | $S_{-1}$ |
| 1 | [1] | [17] | 1 | [1] | [17] |
| 2 | [2] | [22] | 14 | [14] | [12] |
| 3 | [3] | [19] | 7 | [7] | [23] |
| 4 | [4] | [24] | 9 | [9] | [11] |
| 5 | [5] | [21] | 5 | [5] | [21] |
| 6 | [6] | [18] | 10 | [10] | [16] |
| 7 | [7] | [23] | 3 | [3] | [19] |
| 8 | [8] | [20] | 13 | [13] | [15] |
| 9 | [9] | [11] | 4 | [4] | [24] |
| 10 | [10] | [16] | 6 | [6] | [18] |
| 11 | [11] | [13] | 22 | [22] | [6] |
| 12 | [12] | [10] | 24 | [24] | [8] |
| 13 | [13] | [15] | 8 | [8] | [20] |
| 14 | [14] | [12] | 2 | [2] | [22] |
| 15 | [15] | [9] | 18 | [18] | [2] |
| 16 | [16] | [14] | 20 | [20] | [4] |
| 17 | [17] | [5] | 21 | [21] | [1] |
| 18 | [18] | [2] | 15 | [15] | [9] |
| 19 | [19] | [7] | 23 | [23] | [3] |
| 20 | [20] | [4] | 16 | [16] | [14] |
| 21 | [21] | [1] | 17 | [17] | [5] |
| 22 | [22] | [6] | 11 | [11] | [13] |
| 23 | [23] | [3] | 19 | [19] | [7] |
| 24 | [24] | [8] | 12 | [12] | [10] |

FIG.8

SIMULATION RESULT (CASE 2-1)

| | m | INPUT PATTERN 1 | $S'_{2m}$ | $S'_{2m+1}$ | STATE No. | | $S_{2m}$ | $S_{2m+1}$ | STATE No. | |
|---|---|---|---|---|---|---|---|---|---|---|
| | | | | | | | | INITIAL VALUE: (FORMULA 9) | INITIAL VALUE: SET BY CONVERSION TABLE | |
| | | | $S'_{-2}$ | $S'_{-1}$ | 1 | ← | $S_{-2}$ | $S_{-1}$ | 20 | ← |
| R, P, TCH RANDOM BIT | 0 | 0001 | $S'_0$ | $S'_1$ | 6 | | $S_0$ | $S_1$ | 13 | |
| | 1 | 0111 | $S'_2$ | $S'_3$ | 16 | | $S_2$ | $S_3$ | 1 | |
| | 2 | 1001 | $S'_4$ | $S'_5$ | 8 | | $S_4$ | $S_5$ | 15 | |
| | 3 | 0111 | $S'_6$ | $S'_7$ | 13 | | $S_6$ | $S_7$ | 17 | |
| | 4 | 0001 | $S'_8$ | $S'_9$ | 7 | | $S_8$ | $S_9$ | 18 | |
| | 5 | 0101 | $S'_{10}$ | $S'_{11}$ | 9 | | $S_{10}$ | $S_{11}$ | 21 | |
| | 6 | 0100 | $S'_{12}$ | $S'_{13}$ | 19 | | $S_{12}$ | $S_{13}$ | 8 | |
| | 7 | 1100 | $S'_{14}$ | $S'_{15}$ | 16 | | $S_{14}$ | $S_{15}$ | 1 | |
| | 8 | 1110 | $S'_{16}$ | $S'_{17}$ | 21 | | $S_{16}$ | $S_{17}$ | 2 | |
| | 9 | 1001 | $S'_{18}$ | $S'_{19}$ | 13 | | $S_{18}$ | $S_{19}$ | 17 | |
| | 10 | 1010 | $S'_{20}$ | $S'_{21}$ | 20 | | $S_{20}$ | $S_{21}$ | 16 | |
| | 11 | 0110 | $S'_{22}$ | $S'_{23}$ | 23 | | $S_{22}$ | $S_{23}$ | 4 | |
| | 12 | 0111 | $S'_{24}$ | $S'_{25}$ | 2 | | $S_{24}$ | $S_{25}$ | 9 | |
| | 13 | 0010 | $S'_{26}$ | $S'_{27}$ | 13 | | $S_{26}$ | $S_{27}$ | 17 | |
| | 14 | 0010 | $S'_{28}$ | $S'_{29}$ | 21 | | $S_{28}$ | $S_{29}$ | 2 | |
| | 15 | 0010 | $S'_{30}$ | $S'_{31}$ | 6 | | $S_{30}$ | $S_{31}$ | 13 | |
| | 16 | 1111 | $S'_{32}$ | $S'_{33}$ | 7 | | $S_{32}$ | $S_{33}$ | 18 | |
| | 17 | 1011 | $S'_{34}$ | $S'_{35}$ | 2 | | $S_{34}$ | $S_{35}$ | 9 | |
| | 18 | 0101 | $S'_{36}$ | $S'_{37}$ | 1 | | $S_{36}$ | $S_{37}$ | 20 | |
| | 19 | 1011 | $S'_{38}$ | $S'_{39}$ | 24 | | $S_{38}$ | $S_{39}$ | 12 | |
| | 20 | 0001 | $S'_{40}$ | $S'_{41}$ | 9 | | $S_{40}$ | $S_{41}$ | 21 | |
| | 21 | 1101 | $S'_{42}$ | $S'_{43}$ | 21 | | $S_{42}$ | $S_{43}$ | 2 | |
| | 22 | 0010 | $S'_{44}$ | $S'_{45}$ | 6 | | $S_{44}$ | $S_{45}$ | 13 | |
| | 23 | 0110 | $S'_{46}$ | $S'_{47}$ | 17 | | $S_{46}$ | $S_{47}$ | 6 | |
| | 24 | 0000 | $S'_{48}$ | $S'_{49}$ | 10 | | $S_{48}$ | $S_{49}$ | 3 | |
| | 25 | 1011 | $S'_{50}$ | $S'_{51}$ | 17 | | $S_{50}$ | $S_{51}$ | 6 | |
| | 26 | 1000 | $S'_{52}$ | $S'_{53}$ | 24 | | $S_{52}$ | $S_{53}$ | 12 | |
| | 27 | 1010 | $S'_{54}$ | $S'_{55}$ | 7 | | $S_{54}$ | $S_{55}$ | 18 | |
| | 28 | 1101 | $S'_{56}$ | $S'_{57}$ | 8 | | $S_{56}$ | $S_{57}$ | 15 | |
| | 29 | 0010 | $S'_{58}$ | $S'_{59}$ | 16 | | $S_{58}$ | $S_{59}$ | 1 | ← BECOMES STATE No. 1 IMMEDIATELY BEFORE SW |
| SW FIXED BIT | 30 | 1000 | $S'_{60}$ | $S'_{61}$ | 23 | | $S_{60}$ | $S_{61}$ | 4 | |
| | 31 | 0001 | $S'_{62}$ | $S'_{63}$ | 8 | | $S_{62}$ | $S_{63}$ | 15 | |
| | 32 | 1101 | $S'_{64}$ | $S'_{65}$ | 12 | | $S_{64}$ | $S_{65}$ | 5 | SW MAPPING PATTERN IS FIXED |
| | 33 | 0111 | $S'_{66}$ | $S'_{67}$ | 23 | | $S_{66}$ | $S_{67}$ | 4 | |
| | 34 | 0101 | $S'_{68}$ | $S'_{69}$ | 11 | | $S_{68}$ | $S_{69}$ | 23 | |
| | | ... | | | | | | | | |

FIG.9

SIMULATION RESULT (CASE 2-2)

INITIAL VALUE: (FORMULA 9)

INITIAL VALUE: SET BY CONVERSION TABLE

| | m | INPUT PATTERN 2 | $S'_{2m}$ | $S'_{2m+1}$ | STATE No. | | $S_{2m}$ | $S_{2m+1}$ | STATE No. | |
|---|---|---|---|---|---|---|---|---|---|---|
| | | | $S'_{-2}$ | $S'_{-1}$ | 1 | | $S_{-2}$ | $S_{-1}$ | 19 | |
| R, P, TCH RANDOM BIT | 0 | 0111 | $S'_0$ | $S'_1$ | 8 | | $S_0$ | $S_1$ | 6 | |
| | 1 | 0100 | $S'_2$ | $S'_3$ | 10 | | $S_2$ | $S_3$ | 11 | |
| | 2 | 1000 | $S'_4$ | $S'_5$ | 7 | | $S_4$ | $S_5$ | 17 | |
| | 3 | 0010 | $S'_6$ | $S'_7$ | 4 | | $S_6$ | $S_7$ | 2 | |
| | 4 | 1010 | $S'_8$ | $S'_9$ | 19 | | $S_8$ | $S_9$ | 5 | |
| | 5 | 1110 | $S'_{10}$ | $S'_{11}$ | 8 | | $S_{10}$ | $S_{11}$ | 6 | |
| | 6 | 1010 | $S'_{12}$ | $S'_{13}$ | 23 | | $S_{12}$ | $S_{13}$ | 1 | |
| | 7 | 0100 | $S'_{14}$ | $S'_{15}$ | 18 | | $S_{14}$ | $S_{15}$ | 20 | |
| | 8 | 1010 | $S'_{16}$ | $S'_{17}$ | 17 | | $S_{16}$ | $S_{17}$ | 3 | |
| | 9 | 1000 | $S'_{18}$ | $S'_{19}$ | 24 | | $S_{18}$ | $S_{19}$ | 18 | |
| | 10 | 0110 | $S'_{20}$ | $S'_{21}$ | 19 | | $S_{20}$ | $S_{21}$ | 5 | |
| | 11 | 1110 | $S'_{22}$ | $S'_{23}$ | 8 | | $S_{22}$ | $S_{23}$ | 6 | |
| | 12 | 1011 | $S'_{24}$ | $S'_{25}$ | 14 | | $S_{24}$ | $S_{25}$ | 15 | |
| | 13 | 1101 | $S'_{26}$ | $S'_{27}$ | 19 | | $S_{26}$ | $S_{27}$ | 5 | |
| | 14 | 1000 | $S'_{28}$ | $S'_{29}$ | 2 | | $S_{28}$ | $S_{29}$ | 8 | |
| | 15 | 1001 | $S'_{30}$ | $S'_{31}$ | 17 | | $S_{30}$ | $S_{31}$ | 3 | |
| | 16 | 0010 | $S'_{32}$ | $S'_{33}$ | 2 | | $S_{32}$ | $S_{33}$ | 8 | |
| | 17 | 0100 | $S'_{34}$ | $S'_{35}$ | 15 | | $S_{34}$ | $S_{35}$ | 10 | |
| | 18 | 0110 | $S'_{36}$ | $S'_{37}$ | 18 | | $S_{36}$ | $S_{37}$ | 20 | |
| | 19 | 0110 | $S'_{38}$ | $S'_{39}$ | 5 | | $S_{38}$ | $S_{39}$ | 23 | |
| | 20 | 1100 | $S'_{40}$ | $S'_{41}$ | 9 | | $S_{40}$ | $S_{41}$ | 12 | |
| | 21 | 0101 | $S'_{42}$ | $S'_{43}$ | 20 | | $S_{42}$ | $S_{43}$ | 22 | |
| | 22 | 1111 | $S'_{44}$ | $S'_{45}$ | 1 | | $S_{44}$ | $S_{45}$ | 19 | |
| | 23 | 0011 | $S'_{46}$ | $S'_{47}$ | 9 | | $S_{46}$ | $S_{47}$ | 12 | |
| | 24 | 0000 | $S'_{48}$ | $S'_{49}$ | 18 | | $S_{48}$ | $S_{49}$ | 20 | |
| | 25 | 0000 | $S'_{50}$ | $S'_{51}$ | 19 | | $S_{50}$ | $S_{51}$ | 5 | |
| | 26 | 1001 | $S'_{52}$ | $S'_{53}$ | 10 | | $S_{52}$ | $S_{53}$ | 11 | |
| | 27 | 1000 | $S'_{54}$ | $S'_{55}$ | 7 | | $S_{54}$ | $S_{55}$ | 17 | |
| | 28 | 0001 | $S'_{56}$ | $S'_{57}$ | 24 | | $S_{56}$ | $S_{57}$ | 18 | |
| | 29 | 1001 | $S'_{58}$ | $S'_{59}$ | 23 | | $S_{58}$ | $S_{59}$ | 1 | ← BECOMES STATE No. 1 IMMEDIATELY BEFORE SW. |
| SW FIXED BIT | 30 | 1000 | $S'_{60}$ | $S'_{61}$ | 6 | | $S_{60}$ | $S_{61}$ | 4 | |
| | 31 | 0001 | $S'_{62}$ | $S'_{63}$ | 14 | | $S_{62}$ | $S_{63}$ | 15 | SW MAPPING PATTERN IS FIXED |
| | 32 | 1101 | $S'_{64}$ | $S'_{65}$ | 19 | | $S_{64}$ | $S_{65}$ | 5 | |
| | 33 | 0111 | $S'_{66}$ | $S'_{67}$ | 6 | | $S_{66}$ | $S_{67}$ | 4 | |
| | 34 | 0101 | $S'_{68}$ | $S'_{69}$ | 5 | | $S_{68}$ | $S_{69}$ | 23 | |
| | | ... | | | | | | | | |

ARRANGEMENT OF X
IN THE CASE OF QPSK

FIG.15

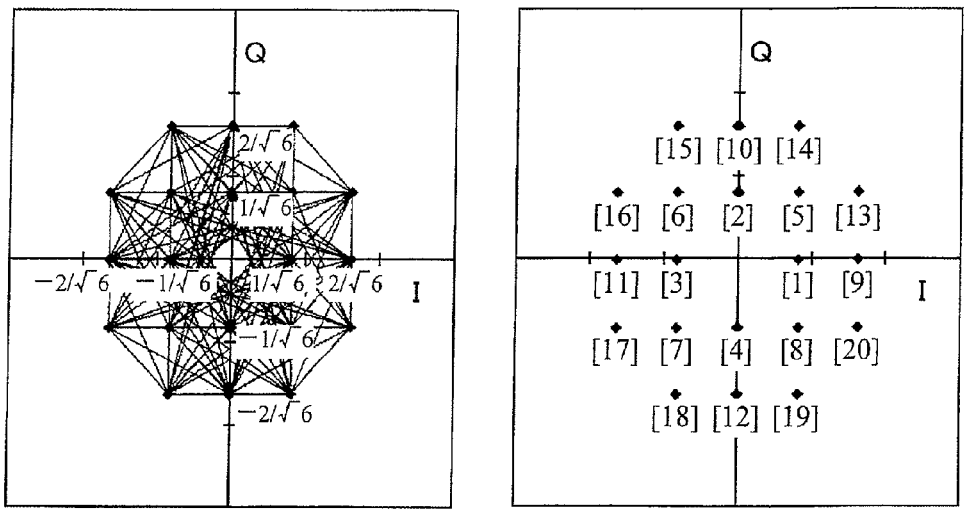

COORDINATES OF 20 POINTS $S = 1/\sqrt{6}\,(1+j\cdot 0)$      $S = 1/\sqrt{6}\,(0+j)$ $S = 1/\sqrt{6}\,(-1+j\cdot 0)$      $S = 1/\sqrt{6}\,(0-j)$ $S = 1/\sqrt{6}\,(1+j)$      $S = 1/\sqrt{6}\,(-1+j)$ $S = 1/\sqrt{6}\,(-1-j)$      $S = 1/\sqrt{6}\,(1-j)$ $S = 1/\sqrt{6}\,(2+j\cdot 0)$      $S = 1/\sqrt{6}\,(0+j\cdot 2)$ $S = 1/\sqrt{6}\,(-2+j\cdot 0)$      $S = 1/\sqrt{6}\,(0-j\cdot 2)$ $S = 1/\sqrt{6}\,(2+j)$      $S = 1/\sqrt{6}\,(1+2\cdot j)$ $S = 1/\sqrt{6}\,(-1+j\cdot 2)$      $S = 1/\sqrt{6}\,(-2+j)$ $S = 1/\sqrt{6}\,(-2-j)$      $S = 1/\sqrt{6}\,(-1-j\cdot 2)$ $S = 1/\sqrt{6}\,(1-j\cdot 2)$      $S = 1/\sqrt{6}\,(2-j)$

J BECOMES IMAGINARY NUMBER UNIT

FIG.16

| STATE No. | $S_{2m}$ | $S_{2m+1}$ |
|---|---|---|
| 1 | [1] | [13] |
| 2 | [1] | [18] |
| 3 | [2] | [15] |
| 4 | [2] | [20] |
| 5 | [3] | [14] |
| 6 | [3] | [17] |
| 7 | [4] | [16] |
| 8 | [4] | [19] |
| 9 | [5] | [11] |
| 10 | [6] | [12] |
| 11 | [7] | [9] |
| 12 | [8] | [10] |
| 13 | [9] | [8] |
| 14 | [10] | [5] |
| 15 | [11] | [6] |
| 16 | [12] | [7] |
| 17 | [13] | [2] |
| 18 | [14] | [4] |
| 19 | [15] | [3] |
| 20 | [16] | [1] |
| 21 | [17] | [4] |
| 22 | [18] | [2] |
| 23 | [19] | [1] |
| 24 | [20] | [3] |

[1] TO [20] REPRESENT MAPPING POINT NUMBERS.

TRANSMITTER AND TRANSMISSION METHOD

TECHNICAL FIELD

The present invention relates to a transmitter and a transmission method which efficiently perform communication by a DSTBC (Differential Space-Time Block Coding) scheme.

BACKGROUND ART

For example, a transmission technique using an STBC (Space-Time Block Coding) scheme has been studied.

RELATED ART

Non-Patent Literature

[NPL 1] IEICE TRANSACTIONS on Communications, VOL. E92-B, No. 6, June 2009

DISCLOSURE OF THE INVENTION

Problems to be Solved by the Invention

However, the STBC scheme has some problems on communication, which demands further development.

An object of the invention is to provide a transmitter and a transmission method which are capable of efficiently performing communication by the DSTBC scheme.

Means for Solving the Problems (Description of Transmitter)
In order to achieve the above-mentioned object, according to the invention, in a transmitter which transmits a signal by the DSTBC scheme, the following configuration is used.

That is, a frame in which a sync word is disposed at a predetermined position subsequent to the head is used.

Further, an initial value control means sets initial values of differential encoding when a DSTBC encoder which processes a transmission target processes the frame, on the basis of values from the head of the frame to a position before the sync word, so that a signal point corresponding to the position immediately before the sync word in the DSTBC encoder which processes the transmission target becomes a specific point.

Accordingly, as the signal point corresponding to the position immediately before the sync word in the DSTBC encoder (mainline DSTBC encoder) which processes the transmission target becomes the specific point, for example, even in a case where the values (for example, a part thereof) from the head of the frame to the position before the sync word are changed by data content of the transmission target, it is possible to set a mapping arrangement of the sync word to a fixed mapping pattern, and to efficiently perform communication between a transmitter and a receiver by the DSTBC scheme.

Here, various frames may be used as the frame. For example, a frame may be used in which changeable data that is sound or the like which is the transmission target is arranged from the head to the position before the sync word.

Further, when the setting is performed so that the signal point corresponding to the position immediately before the sync word becomes the specific point, various points may be used as the specific point, and for example, the specific point may be set in advance.

The transmitter according to the invention has the following configuration as one configuration example.

That is, in the initial value control means, an S/P conversion means performs serial/parallel conversion for the values from the head of the frame to the position before the sync word, a symbol mapping means performs symbol mapping for the serial/parallel conversion result, a differential encoding means performs differential encoding for the symbol mapping result using predetermined initial values, and an initial value setting means sets, on the basis of the differential encoding result, initial values of the differential encoding when the DSTBC encoder which processes the transmission target processes the frame.

(Description of Transmission Method Corresponding to the Above-Described Transmitter)
In order to achieve the above-mentioned object, according to the invention, in a transmission method which transmits a signal by the DSTBC scheme, the following processes are performed.

That is, a frame in which a sync word is disposed at a predetermined location subsequent to the head is used.

Further, serial/parallel conversion is performed for the values from the head of the frame to the position before the sync word, symbol mapping is performed for the serial/parallel conversion result, differential encoding is performed for the symbol mapping result using predetermined initial values, and a process of setting, on the basis of the differential encoding result, initial values of the differential encoding when the DSTBC encoder which processes the transmission target processes the frame is performed so that a signal point corresponding to a position immediately before the sync word in the DSTBC encoder which processes the transmission target becomes a specific point.

Accordingly, as the signal point corresponding to the position immediately before the sync word in the DSTBC encoder (mainline DSTBC encoder) which processes the transmission target becomes the specific point, for example, even in a case where the values (for example, a part thereof) from the head of the frame to the position before the sync word are changed by data content of the transmission target, it is possible to set a mapping arrangement of the sync word to a fixed mapping pattern, and to efficiently perform communication between the transmitter and the receiver by the DSTBC scheme.

Further configuration examples according to the invention are provided as follows.

Configuration Example 1

A transmitter which transmits a signal by a DSTBC scheme, including:

a first differential encoding means for performing differential encoding for values from the head of a frame to a position immediately before a sync word using predetermined initial values;

an initial value setting means for setting initial values on the basis of the differential encoding result immediately before the sync word obtained by the first differential encoding means; and a second differential encoding means for performing differential encoding for the frame as a transmission target using the initial values set by the initial value setting means.

Configuration Example 2

The transmitter according to Configuration Example 1,
wherein the initial value setting means includes a table in which the initial values are set corresponding to the differential encoding result immediately before the sync word possibly obtained when the differential encoding is performed for the values from the head of the frame to the position immediately before the sync word, and sets the initial values used for the differential encoding of the second differential encoding means according to the differential encoding result immediately before the sync word obtained by the first differential encoding means and the table.

Configuration Example 3

A transmission method of transmitting a signal by a DSTBC scheme, including:
performing differential encoding for values from the head of a frame to a position immediately before a sync word using predetermined initial values;
setting initial values used for differential encoding for the frame as a transmission target on the basis of the differential encoding result immediately before the sync word; and
performing the differential encoding in which the frame is the transmission target using the set initial values.

Configuration Example 4

The transmission method according to Configuration Example 3,
wherein a table is provided in which the initial values are set corresponding to the differential encoding result immediately before the sync word possibly obtained when the differential encoding is performed for the values from the head of the frame to the position immediately before the sync word, and the initial values used for the differential encoding in which the frame is the transmission target are set according to the differential encoding result immediately before the sync word and the table.

Configuration Example 5

An initial value table creating method used in a DSTBC scheme in which differential encoding is performed for values from the head of a frame to a position immediately before a sync word using predetermined initial values, initial values are set on the basis of the differential encoding result immediately before the sync word obtained in the differential encoding and an initial value table, and differential encoding for the frame as a transmission target is performed using the set initial values, the method including:
a first step of generating a random bit stream;
a second step of performing differential encoding for the generated bit stream;
a third step of setting, when a final output obtained when the differential encoding is performed in the second step is predetermined first values, the initial values of the differential encoding to arbitrary second values;
a fourth step of performing differential encoding for the generated bit stream using the set second values as initial values; and
a fifth step of storing, when a final output obtained when the differential encoding is performed in the fourth step is predetermined third values, the third values as initial values used when the differential encoding result immediately before the sync word is the first values,
wherein when the final output obtained when the differential encoding is performed in the second step is not the first values, the method includes returning to the first step, and
wherein when the final output obtained when the differential encoding is performed in the fourth step is not the third values, the method includes setting the second values as different values and returning to the fourth step.

Advantage of the Invention

As described above, according to the invention, it is possible to efficiently perform communication by the DSTBC scheme.

BRIEF DESCRIPTION OF THE DRAWINGS

FIG. 3 is a diagram illustrating an example of a simulation result (case 1-1).

FIG. 4 is a diagram illustrating an example of a simulation result (case 1-2).

FIG. 5 is a diagram illustrating an example of signal arrangement of a differential encoding unit according to a second simulation.

FIG. 6 is a diagram illustrating an example of combination of signal arrangement of $S_{2m}$ and $S_{2m+1}$ according to the second simulation.

FIG. 8 is a diagram illustrating an example of a simulation result (case 2-1).

FIG. 9 is a diagram illustrating an example of a simulation result (case 2-2).

FIG. 15 is a diagram illustrating another example of signal arrangement in DSTBC.

FIG. 16 is a diagram illustrating an example of combination of signal arrangement of $S_{2m}$ and $S_{2m+1}$.

MODE FOR CARRYING OUT THE INVENTION

Embodiments of the invention will be described with reference to the accompanying drawings.

Figure 10:
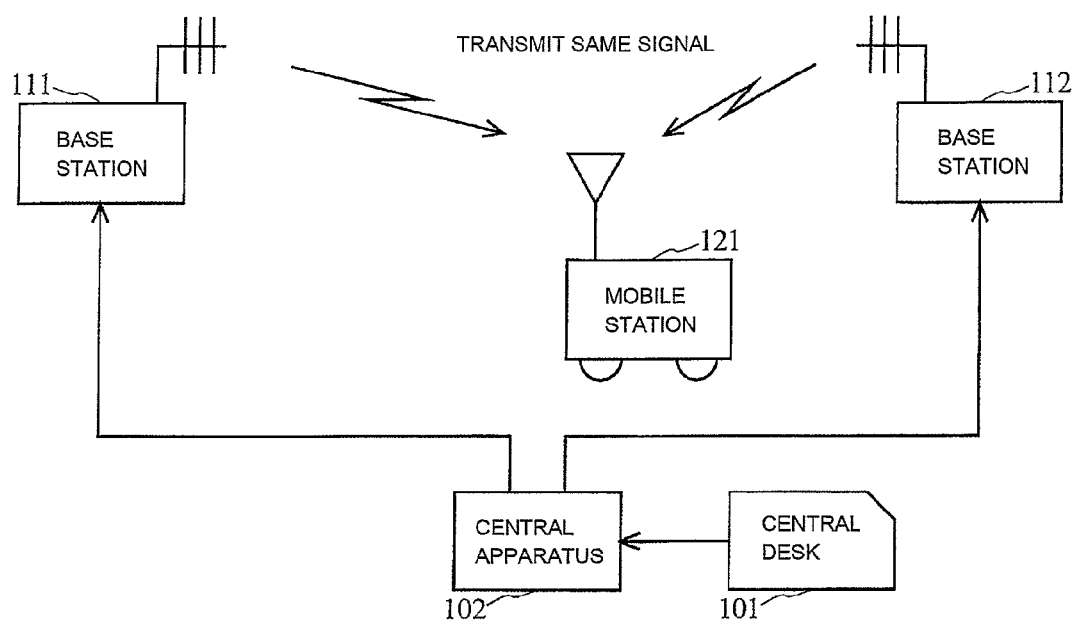
FIG. 10 is a diagram illustrating a configuration example of a train radio system.

FIG. 10 shows a configuration example of a train radio system as an example of a radio communication system.

The train radio system of this example includes a central desk 101, a central apparatus 102, a plurality of (here, two) base station apparatuses 111 and 112, and a train mobile station apparatus 121.

Here, the central desk 101 performs control or the like for the central apparatus 102.

Further, the central apparatus 102 and the respective base station apparatuses 111 and 112 are connected by a wired line such as an optical fiber, and a signal digitalized in the bit stream of {0, 1} is transmitted between them.

Further, the respective base station apparatuses 111 and 112 and the mobile station apparatus 121 are connected by a wireless line. Further, voice communication and data communication are performed between the central desk 101 and the mobile station apparatus 121 through the central apparatus 102 or the base station apparatuses 111 and 112.

For example, as in the train radio system, in a case where one wave is given as radio frequency and one zone is formed in the plurality of base station apparatuses 111 and 112, the same signal is transmitted with the same frequency from the respective base station apparatuses 111 and 112. Here, electric power received in the mobile station apparatus 121 is fluctuated according to the phase relationship of components arrived from two base station apparatuses 111 and 112, and for example, in the worst case where the electric powers of two arrived waves are the same and the phase difference is 180°, the received signal is lost. This phenomenon is called same wave interference.

In order to solve the above-mentioned problem, there is a DSTBC scheme which employs a MIMO (Multiple Input Multiple Output) technique in digital radio communication.

(Description of Fundamental Configuration Example of the Invention)

Figure 11:
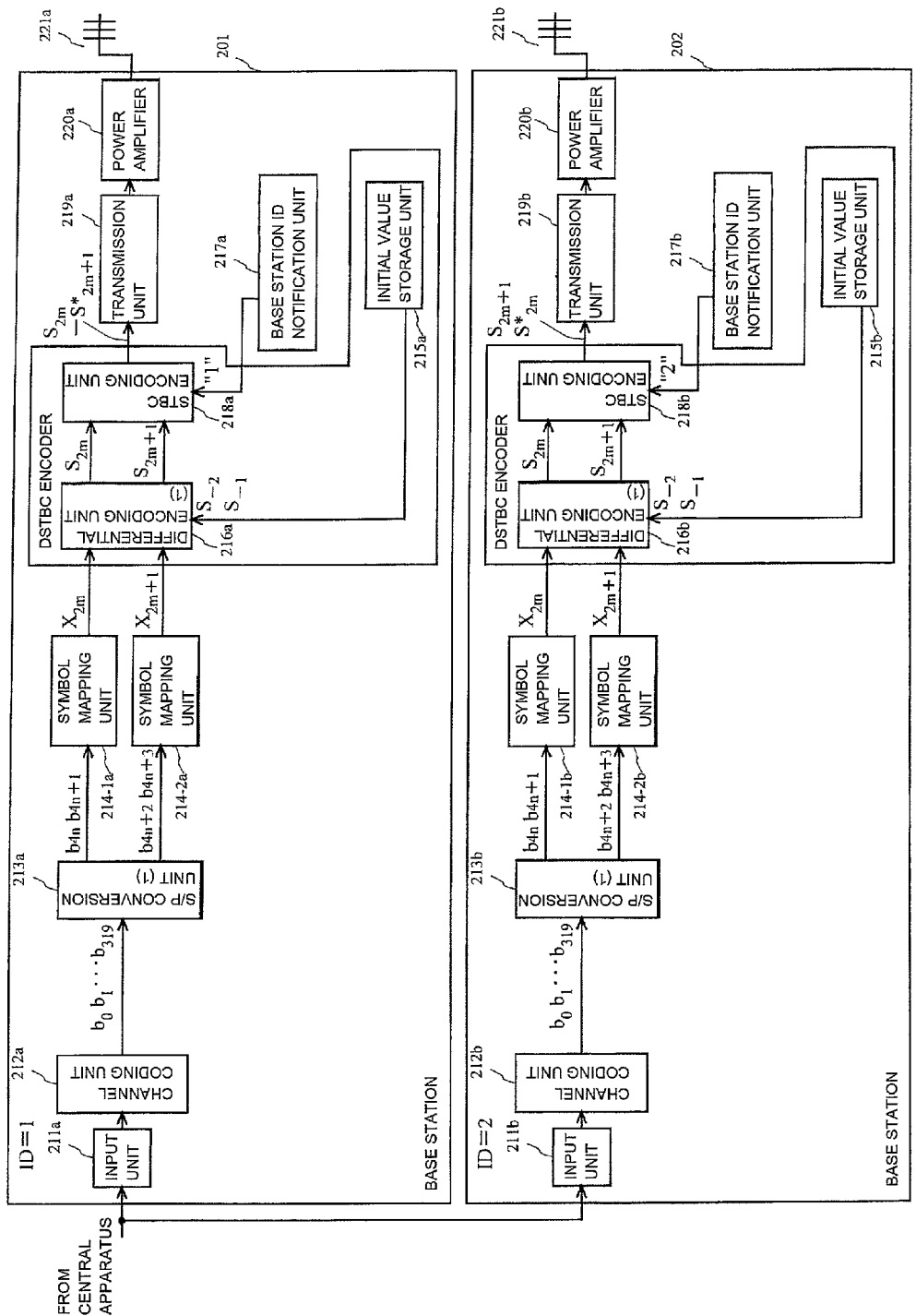
FIG. 11 is a diagram illustrating a configuration example of a transmitter of a base station apparatus using a DSTBC scheme.

FIG. 11 shows a configuration example of a transmitter of a base station apparatus using the DSTBC scheme. In this example, a case where 4-valued digital modulation (2 bits/1 symbol) is used is shown.

In this example, a configuration example of a transmitter of a base station apparatus 201 on which identification information (ID) is 1 and a configuration example of a transmitter of a base station apparatus 202 on which ID is 2 are shown.

The transmitter of the first base station apparatus 201 includes an input unit 211a, a channel coding unit 212a, a serial/parallel (S/P) conversion unit 213a, two symbol mapping units 214-1a and 214-2a, an initial value storage unit 215a, a differential encoding unit 216a, a base station ID notification unit 217a, an STBC encoding unit 218a, a transmission unit 219a, a power amplifier 220, and a transmission antenna 221a.

In this example, a DSTBC encoder is configured by the initial value storage unit 215a, the differential encoding unit 216a, and the STBC encoding unit 218a.

The transmitter of the second base station apparatus 202 includes an input unit 211b, a channel coding unit 212b, a serial/parallel (S/P) conversion unit 213b, two symbol mapping units 214-1b and 214-2b, an initial value storage unit 215b, a differential encoding unit 216b, a base station ID notification unit 217b, an STBC encoding unit 218b, a transmission unit 219b, a power amplifier 220b, and a transmission antenna 221b.

In this example, a DSTBC encoder is configured by the initial value storage unit 215b, the differential encoding unit 216b, and the STBC encoding unit 218b.

An operation example in the transmitters of the base station apparatuses 201 and 202 in this example is shown.

Since schematic operations in the transmitters of the respective base station apparatuses 201 and 202 are the same, the transmitter of the first base station apparatus 201 is described as representative, and only different operations of the transmitter of the second base station apparatus 202 will be described.

The input unit 211a receives a signal obtained by digitalizing a sound signal (sound data) or the like transmitted from the central apparatus and outputs the sound signal to the channel coding unit 212a.

The channel coding unit 212a generates, according to a designated frame format, transmission frame data which includes sound data (TCH: Traffic Channel) from the input section 211a or known fixed bit value information such as a sync word (SW: Sync Word) used for a demodulation process on a reception side (for example, the side of the mobile station apparatus), and the like, and outputs a bit stream {lot; t=0, 1, ..., and T−1} of {0, 1} to the S/P conversion unit 213a. Here, T is a natural number.

Figure 12:
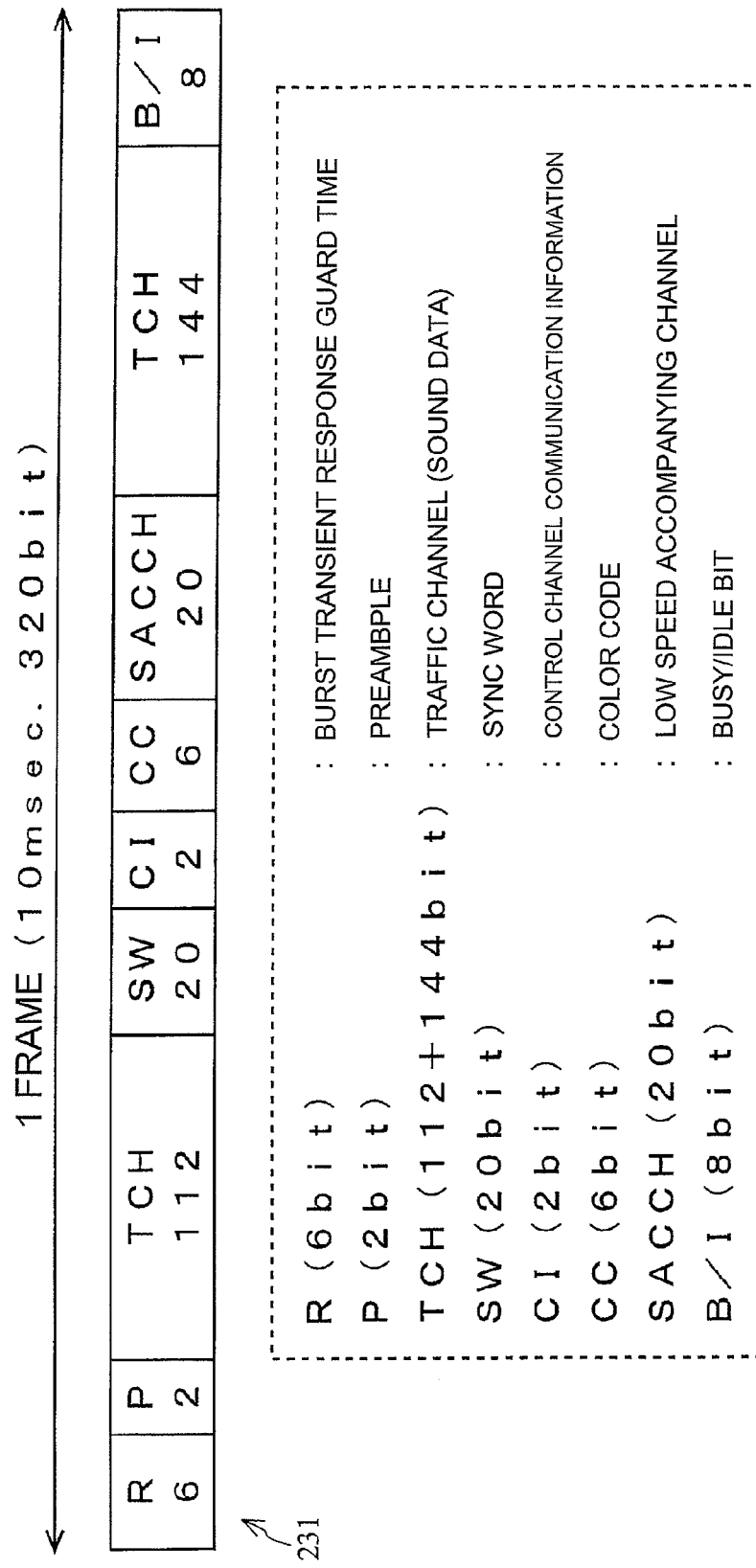
FIG. 12 is a diagram illustrating an example of the format of a transmission frame.

FIG. 12 shows an example of the format of a transmission frame 231 output from the channel coding unit 212a. In this example, T=320.

The S/P conversion unit 213a divides an input bit stream corresponding to one frame from the channel coding unit 212a every two symbols to output the result to the respective symbol mapping units 214-1a and 214-2a at symbol timings. Specifically, in a case where four-valued digital modulation (2 bits/1 symbol) is used, the S/P conversion unit 213a divides an input ($b_{4n}$, $b_{4n+1}$, $b_{4n+2}$ and $b_{4n+3}$) corresponding to 4 bits into two symbols of the first half ($b_{4n}$ and $b_{4n+1}$) and the second half ($b_{4n+2}$ and $b_{4n+3}$), and outputs ($b_{4n}$ and $b_{4n+1}$) to the first symbol mapping unit 214-1a at the first symbol timing and ($b_{4n+2}$, $b_{4n+3}$) to the second symbol mapping unit 214-2a at the second symbol timing.

Here, n=0, 1, ..., and T/4-1 is a time series number which varies every four bits.

If ($b_{4n}$, $b_{4n+1}$) is input from the S/P conversion unit 213a, the first symbol mapping unit 214-1a performs mapping according to symbol modulation which is designated in advance to output the result $X_{2m}$ to the differential encoding unit 216a.

If ($b_{4n+2}$, $b_{4n+3}$) is input from the S/P conversion unit 213a, the second symbol mapping unit 214-2a performs mapping according to symbol modulation which is designated in advance to output the result $X_{2m+1}$ to the differential encoding unit 216a.

With respect to two symbols divided by the S/P conversion unit 213a, the symbol modulation $X_{2m}$ for the input of ($b_{4n}$, $b_{4n+1}$) and the symbol modulation $X_{2m+1}$ for the input of ($b_{4n+2}$ $b_{4n+3}$) are output by two symbol mapping units 214-1a and 214-2a.

Here, m is m=n (m=0, 1, ..., and T/4−1) and is a time series number which varies every two symbols, and $X_{2m}$ and $X_{2m+1}$ are complex numbers.

Figure 13:
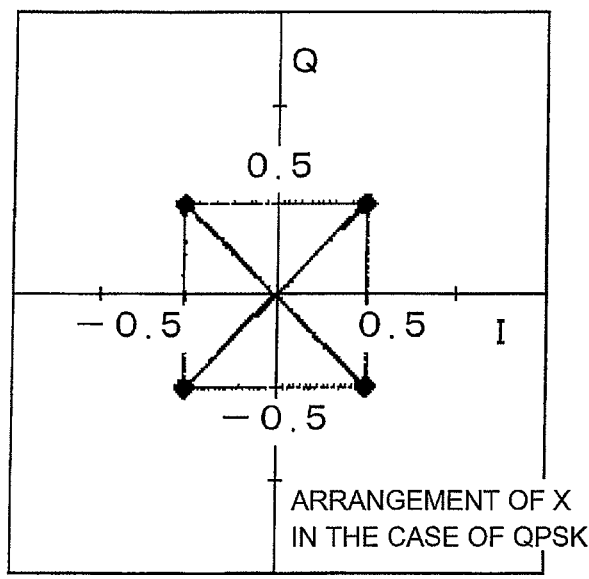
FIG. 13 is a diagram illustrating an example of signal arrangement in QPSK modulation.

FIG. 13 shows an example of signal arrangement of X ($X_{2m}$ or $X_{2m+1}$) in QPSK (Quadrature Phase Shift Keying) modulation. The horizontal axis represents an in-phase (I) component, and the vertical axis represents an orthogonal (Q) component.

After $X_{2m}$ and $X_{2m+1}$ are input from two symbol mapping units 214-1a and 214-2a, the differential coding unit 216a outputs $S_{2m}$ and $S_{2m+1}$ obtained by operation of Formula 1 to the STBC encoding unit 218a.

Here, * represents conjugate complex numbers. $S_{2m}$ and $S_{2m+1}$ are complex numbers. Further, the combination of $S_{2m}$ and $S_{2m+1}$ is defined as a state.

The initial value storage unit 215a outputs initial values $S_{-2}$ and $S_{-1}$ where m=0 to the differential encoding unit 216a for setting.

[Formula 1]

$$\begin{bmatrix} S_{2m} \\ S_{2m+1} \end{bmatrix} = \begin{bmatrix} S_{2m-2} & -S_{2m-1}^* \\ S_{2m-1} & S_{2m-2}^* \end{bmatrix} \cdot \begin{bmatrix} X_{2m} \\ X_{2m+1} \end{bmatrix} \quad \text{(Formula 1)}$$

The base station ID notification unit 217*a* outputs and notifies a base station ID number to the STBC encoding unit 218*a*. In this example, the base station ID notification unit 217*a* of the first base station apparatus 201 notifies a base station ID number 1 (ID=1) to the STBC encoding unit 218*a*, and the base station ID notification unit 217*b* of the second base station apparatus 202 notifies a base station ID number 2 (ID=2) to the STBC encoding unit 218*b*.

The STBC encoding unit 218*a* obtains values $S_{2m}$, $-S_{2m+1}^*$, $S_{2m+1}$ and $S_{2m}^*$ based on the inputs $S_{2m}$ and $S_{2m+1}$ from the differential encoding unit 216*a*, has a switch function, and determines the base station ID number notified from the base station ID notification unit 217*a* by the switch function, and according to the result, outputs a value selected from among the values based on the inputs $S_{2m}$ and $S_{2m+1}$ from the differential encoding unit 216*a* to the transmission unit 219*a*.

In this example, the switch function of the STBC encoding units 218*a* and 218*b* determines whether the base station ID number is odd or even. As a result, in a case where the base station ID number is odd (here, in the case of the first base station apparatus 201), $S_{2m}$ and $-S_{2m+1}^*$ are sequentially output to the transmission units 219*a* and 219*b*, and in a case where the base station ID number is even (here, in the case of the second base station apparatus 202), $S_{2m+1}$ and $S_{2m}^*$ are sequentially output to the transmission units 219*a* and 219*b*.

The transmission unit 219*a* performs a D/A (Digital to Analog) conversion process or an orthogonal modulation process for the input from the STBC encoding unit 218*a*, performs modulation at a desired radio transmission frequency, and then outputs the result signal to the power amplifier 220*a*.

The power amplifier 220*a* amplifies the output from the transmission unit 219*a* up to a radio output level, and then outputs the result to the transmission antenna 221*a*.

The transmission antenna 221*a* outputs the signal input from the power amplifier 220*a* in a wireless manner.

Here, in this example, the configuration example in which the switch function is provided in the STBC encoding units 218*a* and 218*b* is shown, but another configuration in which a switch having such a switch function is provided between the STBC encoding units 218*a* and 218*b* and the transmission units 219*a* and 219*b* (on the inside or outside of the DSTBC encoder) may be employed. In this case, the base station ID notification units 217*a* and 217*b* notify the base station ID number to each switch (instead of the STBC encoding units 218*a* and 218*b*), and the STBC encoding units 218*a* and 218*b* obtain the values $S_{2m}$, $-S_{2m+1}^*$, $S_{2m+1}$, and $S_{2m}^*$ based on the inputs $S_{2m}$ and $S_{2m+1}$ from the differential encoding units 216*a* and 216*b* and output the result to each switch. Each switch determines the base station ID number notified from the base station ID notification units 217*a* and 217*b*, and according to the result, outputs a value selected from the values input from the STBC encoding units 218*a* and 218*b* to the transmission units 219*a* and 219*b*. The transmission units 219*a* and 219*b* process the input from each switch (instead of the input from the STBC encoding units 218*a* and 218*b*).

Next, an operation example of the symbol mapping units 214-1*a* and 214-2*a* and the differential encoding unit 216*a* will be described.

In a case where the symbol mapping units 214-1*a* and 214-2*a* correspond to QPSK modulation, an output X ($X_{2m}$ or $X_{2m+1}$) is expressed by Formula 2.

Here, j represents an imaginary number.

[Formula 2]

$X=1/2(1+j)$ when input bits are "00"

$X=1/2(-1+j)$ when input bits are "01"

$X=1/2(-1-j)$ when input bits are "11"

$X=1/2(1-j)$ when input bits are "10"  (Formula 2)

The outputs $S_{2m}$ and $S_{2m+1}$ from the differential encoding unit 216*a* are calculated by using Formula 1.

Figure 14:
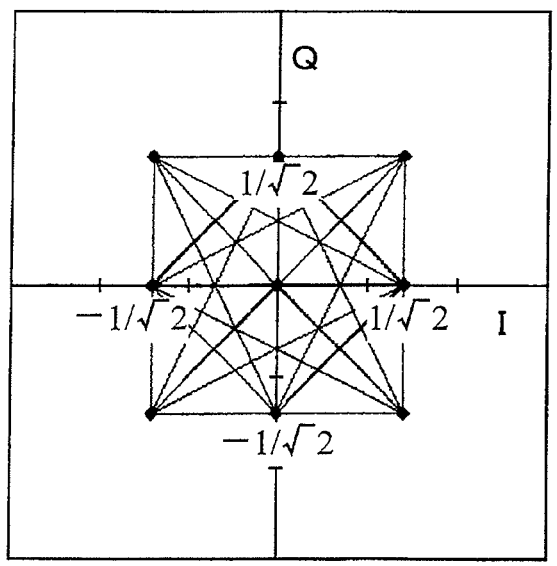
FIG. 14 is a diagram illustrating an example of signal arrangement in DSTBC.

As an example, when outputs and $S_{-1}$ from the initial value setting unit 215*a* are given by Formula 3 and input bits of the symbol mapping units 214-1*a* and 214-2*a* awe randomly changed, if X ($X_{2m}$ or $X_{2m+1}$) in Formula 2 is substituted in Formula 1, the arrangement of signals output from the differential encoding unit 216*a* is as shown in FIG. 14.

FIG. 14 shows an example of signal arrangement in DSTBC. The horizontal axis represents an in-phase (I) component, and the vertical axis represents an orthogonal (Q) component.

[Formula 3]

$$\begin{bmatrix} S_{-2} \\ S_{-1} \end{bmatrix} = \frac{1}{\sqrt{2}} \begin{bmatrix} 1 \\ 1 \end{bmatrix} \quad \text{(Formula 3)}$$

As another example, when the outputs $S_{-2}$ and $S_{-1}$ from the initial value setting unit 215*a* are given by Formula 4 and the input bits of the symbol mapping units 214-1*a* and 214-2*a* are randomly changed, if X ($X_{2m}$ or $X_{2m+1}$) in Formula 2 is substituted in Formula 1, the arrangement of signals output from the differential encoding unit 216*a* is as shown in FIG. 15.

FIG. 15 shows an example of signal arrangement in DSTBC, and shows coordinates S of 20 points thereof, in which a number (mapping point number) is assigned to each symbol value. The horizontal axis represents an in-phase (I) component, and the vertical axis represents an orthogonal (Q) component.

[Formula 4]

$$\begin{bmatrix} S_{-2} \\ S_{-1} \end{bmatrix} = \frac{1}{\sqrt{6}} \begin{bmatrix} 1 \\ 2+j \end{bmatrix} \quad \text{(Formula 4)}$$

Specifically, in the mapping arrangement shown in FIG. 15, the numbers of [1] to [20] are assigned to the 20 output points.

According to the calculation result of Formula 1, it is confirmed that the combination of $S_{2m}$ and $S_{2m+1}$ has 24 types of combination states shown in a table of FIG. 16.

The table of FIG. 16 shows an example of combinations of signal arrangement of $S_{2m}$ and $S_{2m+1}$ when Formula 4 is used as initial values and state numbers (state No.) corresponding thereto.

In comparison of the signal arrangement in FIG. 14 with the signal arrangement in FIG. 15, the signal arrangements are different from each other in the number of mapping points and the arrangement points of S by a selection method of the initial value, but if the initial values is any one of the state numbers (state No.) shown in FIG. 16, it is confirmed that deviation is performed in 20 points which are the same as in FIG. 15.

Further, Formula 1 shows that the output mapping ($S_{2m}$ and $S_{2m+1}$) in the DSTBC scheme depends on an output ($S_{2m-2}$ and $S_{2m-1}$) at a previous timing (or depends on the initial values ($S_{-2}$ and $S_{-1}$) in a case where m=0).

This means that even though the inputs of the symbol mapping units 214-1a and 214-2a are known fixed bit patterns like the sync word and the arrangement and deviation of X are fixed, the mapping arrangement of the DSTBC varies depending on the immediately previous output mapping arrangement, that is, the bit pattern of the sound data input before the sync word (SW).

Generally, in the case of a digital radio method, in a function unit of a demodulation process, which is mounted in a mobile station apparatus (for example, the mobile station apparatus 121 shown in FIG. 10), an algorithm in which it is assumed that the mapping arrangement of the sync word is already known is employed. In this regard, for example, in an automatic frequency control (AFC) process, a phase error between a demodulation de-mapping arrangement result of the sync word and the known mapping arrangement of the sync word is calculated, to thereby perform reception frequency correction.

However, in the modulation process using the DSTBC scheme, as described above, since the mapping arrangement of the sync word is changed depending on the immediately previous sound data input, for example, when the AFC process is performed on a reception side, a mapping arrangement point which becomes a reference is unstable, which causes the problem to be solved.

Embodiments

Figure 1:
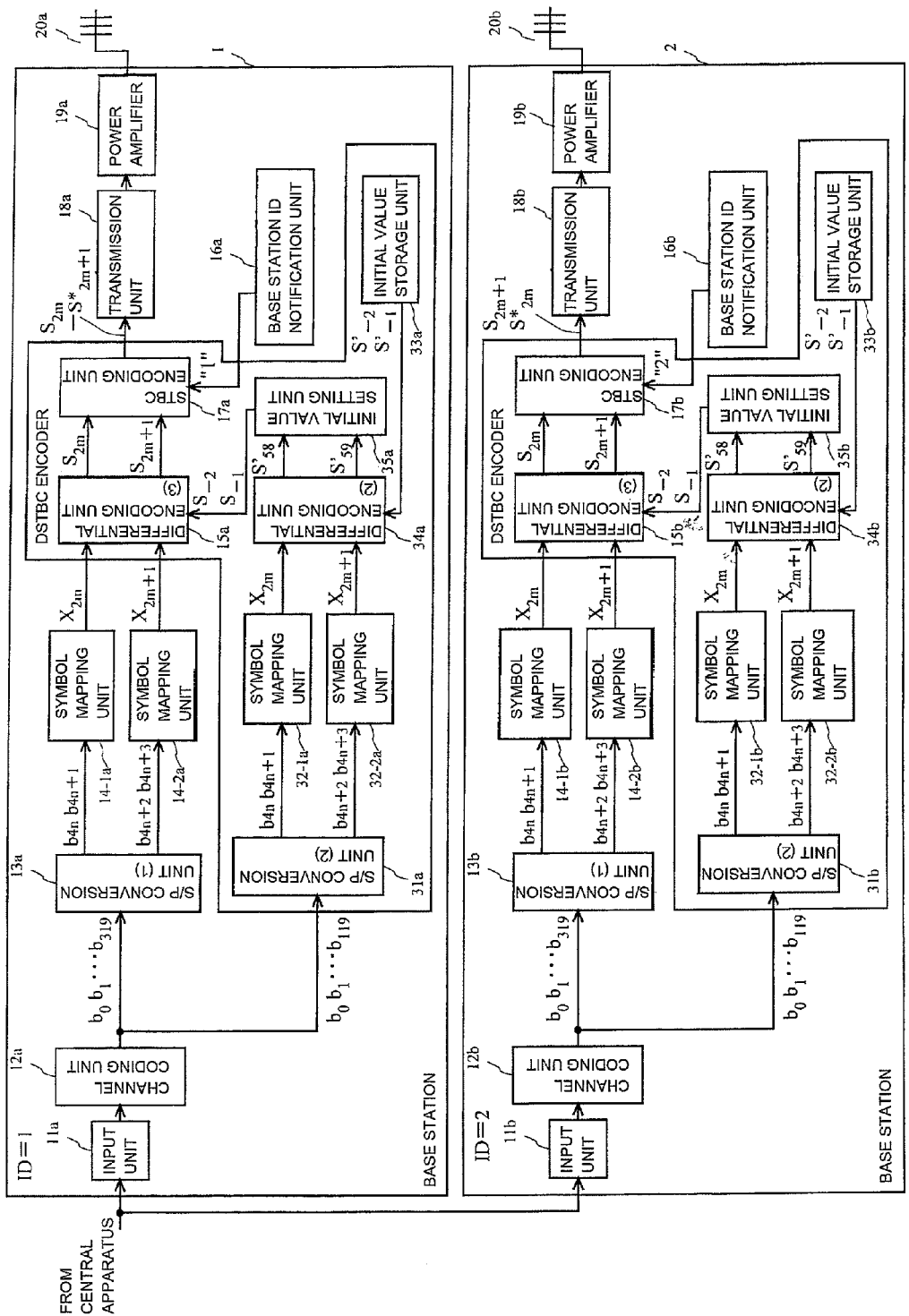
FIG. 1 is a diagram illustrating a configuration example of a transmitter of a base station apparatus using a DSTBC scheme according to an embodiment of the invention.

FIG. 1 is a diagram illustrating a configuration example of a transmitter of a base station apparatus using the DSTBC scheme according to an embodiment of the invention. In this example, a case where 4-valued digital modulation (2 bits/1 symbol) is used is shown.

In this example, a configuration example of a transmitter of a base station apparatus 1 on which identification information (ID) is 1 and a configuration example of a transmitter of a base station apparatus 2 on which ID is 2 are shown.

The transmitter of the first base station apparatus 1 includes an input unit 11a, a channel coding unit 12a, a serial/parallel (S/P) conversion unit 13a, two symbol mapping units 14-1a and 14-2a, a differential encoding unit 15a, a base station ID notification unit 16a, an STBC encoding unit 17a, a transmission unit 18a, a power amplifier 19a, and a transmission antenna 20a, and further includes an S/P conversion unit 31a, two symbol mapping units 32-1a and 32-2a, an initial value storage unit 33a, a differential encoding unit 34a, and an initial value setting unit 35a.

In this example, a DSTBC encoder is configured by the differential encoding unit 15a, the STBC encoding unit 17a, the S/P conversion unit 31a, two symbol mapping units 32-1a and 32-2a, the initial value storage unit 33a, the differential encoding unit 34a, and the initial value setting unit 35a.

The transmitter of the second base station apparatus 2 includes an input unit 11b, a channel coding unit 12b, a serial/parallel (S/P) conversion unit 13b, two symbol mapping units 14-1b and 14-2b, a differential encoding unit 15b, a base station ID notification unit 16b, an STBC encoding unit 17b, a transmission unit 18b, a power amplifier 19b, and a transmission antenna 20b, and further includes an S/P conversion unit 31b, two symbol mapping units 32-1b and 32-2b, an initial value storage unit 33b, a differential encoding unit 34b, and an initial value setting unit 35b.

In this example, a DSTBC encoder is configured by the differential encoding unit 15b, the STBC encoding unit 17b, the S/P conversion unit 31b, two symbol mapping units 32-1b and 32-2b, the initial value storage unit 33b, the differential encoding unit 34b, and the initial value setting unit 35b.

Here, in the above example, two differential encoding units 15a and 34a are installed in the transmitter of the first base station apparatus 1, and two differential encoding units 15b and 34b are installed in the second base station apparatus 2, but this is merely an example. That is, for example, a calculation region inside the differential encoding unit may be divided to perform a plurality of differential encoding processes in one differential encoding unit, and the number of differential encoding units is not limited to this example (here, two).

An operation example in the transmitters of the base station apparatuses 1 and 2 is shown.

Since schematic operations in the transmitters of the respective base station apparatuses 1 and 2 are the same, the transmitter of the first base station apparatus 1 will be described as a representative.

Further, in this example, differences with the configurations or operations of the transmitters of the base station apparatuses 201 and 202 shown in FIG. 11 will be mainly described, and detailed description about the same configurations or operations will be omitted.

Further, in this example, it is assumed that the format of transmission frames generated in the channel coding units 12a and 12b is based on the format shown in FIG. 12.

Firstly, configurations or operations of the input unit 11a, the channel coding unit 12a, the S/P conversion unit 13a, two symbol mapping units 14-1a and 14-2a, the differential encoding unit 15a, the base station ID notification unit 16a, the STBC encoding unit 17a, the transmission unit 18a, the power amplifier 19a, and the transmission antenna 20a are approximately the same as those of corresponding processing units shown in FIG. 11, respectively. Here, in this example, the differences with the processing units shown in FIG. 11 are in that the channel coding unit 12a generates one transmission frame according to the frame format and outputs the bit stream {bt; t=0, 1, . . . , and T} of {0, 1} (here, T=319) to the S/P conversion unit 13a and also to the S/P conversion unit 31a, and in that the initial values $S_{-2}$ and $S_{-1}$ input to the differential encoding unit 15a are output from the initial value setting unit 35a.

Then, the S/P conversion unit 31a, two symbol mapping units 32-1a and 32-2a, the initial value storage unit 33a, the differential encoding unit 34a, and the initial value setting unit 35a which are main characteristics of the example will be described.

The S/P conversion unit 31a has the same main function as that of the S/P conversion unit 13a, but the input bit number corresponds to one transmission frame (320 bits) in the S/P conversion unit 13a whereas the input bit number corresponds to 120 bits (R, P and TCH shown in FIG. 12) from the head to a position immediately before the sync word in the S/P conversion units 31a. Further, the synchronization and output are performed at the symbol timing in the S/P conversion unit 13a whereas the sequential symbol division and output are performed after the subsequent processes are completed in the S/P conversion unit 31a.

Specifically, the S/P converting section 31a imports 120 bits from the head in one transmission frame from the channel coding unit 12a to the sync word, divides the input ($b_{4n}$ and $b_{4n+1}$, $b_{4n+2}$ and $b_{4n+3}$) corresponding to four bits into two symbols (here, 2 bits/1 symbol) of the first half ($b_{4n}$ and $b_{4n+1}$) and the second half ($b_{4n+2}$ and $b_{4n+3}$) with respect to the input bit stream corresponding to 120 bits, and then outputs the first half ($b_{on}$ and $b_{4n+1}$) to the first symbol mapping unit 32-1a and outputs the second half ($b_{4n+2}$ and $b_{4n+3}$) to the second symbol mapping unit 32-2a.

The respective symbol mapping units 32-1a and 32-2a have the same main functions as those of the respective symbol mapping units 14-1a and 14-2a.

Specifically, if ($b_{4n}$ and $b_{4n+1}$) is input from the S/P conversion unit 31a, the first symbol mapping unit 32-1a performs mapping according to the symbol modulation which is designated in advance and outputs the result $X_{2m}$ to the differential encoding unit 34a.

Further, if ($b_{4n+2}$ and $b_{4n+3}$) is input from the S/P conversion unit 31a, the second symbol mapping unit 32-2a performs mapping according to the symbol modulation which is designated in advance and outputs the result $X_{2m+1}$ to the differential encoding unit 34a.

In this way, the modulations to $X_{2m}$ and $X_{2m+1}$ are sequentially performed by the symbol mapping units 32-1a and 32-2a.

After $X_{2m}$ and $X_{2m+1}$ are input from two symbol mapping units 32-1a and 32-2a, the differential encoding units 34a sequentially calculates $S'_{2m}$ and $S'_{2m+1}$ by operation of Formula 5, and outputs obtained values $S'_{58}$ and $S'_{59}$ (final two values for 120 bits) when m=29 to the initial value setting unit 35a.

The initial value storage unit 33a outputs values shown in Formula 6 as initial values $S'_{-2}$ and $S'_{-1}$ where m=0 to the differential encoding unit 34a for setting.

[Formula 5]

$$\begin{bmatrix} S'_{2m} \\ S'_{2m+1} \end{bmatrix} = \begin{bmatrix} S'_{2m-2} & -S'^{*}_{2m-1} \\ S'_{2m-1} & S'^{*}_{2m-2} \end{bmatrix} \cdot \begin{bmatrix} X_{2m} \\ X_{2m+1} \end{bmatrix} \quad \text{(Formula 5)}$$

[Formula 6]

$$\begin{bmatrix} S'_{-2} \\ S'_{-1} \end{bmatrix} = \frac{1}{\sqrt{6}} \begin{bmatrix} 1 \\ 2+j \end{bmatrix} \quad \text{(Formula 6)}$$

The initial value setting unit 35a calculates the initial values $S_{-2}$ and $S_{-1}$ of the differential encoding unit 15a from the outputs $S'_{58}$ and $S'_{59}$ from the differential encoding unit 34a and outputs the result to the differential encoding unit 15a.

Here, as another configuration example, a configuration in which the differential encoding unit 34a outputs state numbers (state No.) corresponding to the values $S'_{58}$ and $S'_{59}$ to the initial value setting unit 35a, and the initial value setting unit 35a calculates the initial values $S_{-2}$ and $S_{-1}$ of the differential encoding unit 15a from the state numbers from the differential encoding unit 34a may be used.

In a similar way to FIG. 11, the calculation of Formula 1 is performed in the differential encoding unit 15a, and the initial values $S_{-2}$ and $S_{-1}$ given from the initial value setting unit 35a are used in this example.

Next, a process performed by the initial value setting unit 35a will be described in detail.

Figure 2:
FIG. 2 is a diagram illustrating an example of a table of conversion from input into output in an initial value setting unit.

In this example, the initial value setting unit 35a calculates the initial values $S_{-2}$ and $S_{-1}$ of the differential encoding unit 15a from the outputs $S'_{58}$ and $S'_{59}$ (or state No) from the differential encoding unit 34a according to the content of a table (conversion table) shown in FIG. 2 and outputs the result to the differential encoding unit 15a.

FIG. 2 is a diagram illustrating an example of a table of conversion from input into output in the initial value setting unit 35a.

Specifically, a list of the output values $S'_{58}$ and $S'_{59}$ in the positions immediately before the sync word from the differential encoding unit 34a at the first stage and corresponding state numbers (information about the input of the initial value setting unit 35a) is shown, which is the same as the content shown in FIG. 16. Further, a list of the initial values $S_{-2}$ and $S_{-1}$ of the differential encoding unit 15a at the second stage and corresponding state numbers (information about the output of the initial value setting unit 35a) is shown. Further, if the state number of the input is determined in the initial value setting unit 35a, the output of the corresponding state number (in the conversion table of FIG. 2, "state No." in the same row) is performed. The mapping point numbers of [1] to [20] represent the same symbol values as in FIG. 15.

In this example, 120 bits from the head of the frame are processed by the S/P conversion unit 31a to the initial value setting unit 35a to calculate the initial values $S_{-2}$ and $S_{-1}$, and then, the processes of the processing units (for example, the S/P conversion unit 13a to the STBC encoding unit 17a) subsequent to the S/P conversion unit 13a are started to sequentially calculate $X_{2m}$ and $X_{2m+1}$ by the symbol mapping units 14-1a and 14-2a and to sequentially calculate $S_{2m}$ and $S_{2m+1}$ by the differential encoding unit 15a, to thereby process 320 bits from the head of the frame. In this case, with respect to S0 and S1 when m=0, calculation is performed using the initial values $S_{-2}$ and $S_{-1}$.

Here, if Formula 1 is calculated by the differential encoding unit 15a using the initial values $S_{-2}$ and $S_{-1}$ as in the example, the calculation result when m=29, that is, the combination of $S_{58}$ and $S_{59}$ immediately before the sync word necessarily corresponds to "state No. 1", and the mapping arrangement of $S_{2m}$ and $S_{2m+1}$ (m=30 to 34) of the sync word may be set to a fixed mapping pattern according to a fixed bit pattern.

(Description about Example of First Simulation)

FIG. 3 is a diagram illustrating an example of a simulation result (case 1-1). In this case, since the combination of $S'_{58}$ and $S'_{59}$ which are the output values of the differential encoding unit 34a when m=29 corresponds to "state No. 4", the initial values $S_{-2}$ and $S_{-1}$ corresponding to "state No. 12" are used on the basis of the conversion table of FIG. 2.

FIG. 4 is a diagram illustrating an example of simulation result (case 1-2). In this case, since the combination of $S'_{58}$ and $S'_{59}$ which are the output values of the differential encoding unit 34a when m=29 corresponds to "state No. 24", the initial values $S_{-2}$ and $S_{-1}$ corresponding to "state No. 20" are used on the basis of the conversion table of FIG. 2.

Here, in the simulations in this example, the input up to the sync word is set to a random bit input and the sync word is set to a fixed pattern. Further, in FIGS. 3 and 4, the deviation of $S_{2m}$ and $S_{2m+1}$ according to the input pattern and the transition of $S'_{2m}$ and $S'_{2m+1}$ are expressed as deviation of the state number.

The results shown in FIG. 3 and FIG. 4 are different from each other in the bit pattern of 120 bits of the random bit input, but show that the state number immediately before the sync word is 1 and the mapping pattern of the sync word is the fixed mapping pattern. Verification is completed for other input patterns as input data, and the same result is achieved.

In this example, the initial value storage unit 33a outputs values shown in Formula 6 as the initial values $S'_{-2}$ and $S'_{-1}$ where m=0 to the differential encoding unit 34a for setting, but different initial values specified as described later may be used.

That is, if the respective coordinates of 20 points shown in FIG. 15 are classified with reference to the distance from the origin and the phase, they may be classified into a first group which includes four coordinates expressed as a coordinate S of Formula 10, a second group which includes four coordinates expressed as a coordinate S of Formula 11, a third group which includes four coordinates expressed as a coordinate S of Formula 12, a fourth group which includes four coordinates expressed as a coordinate S of Formula 13, and a fifth group which includes four coordinates expressed as a coordinate S of Formula 14. In Formula 10 to Formula 14, k is an integer of 0 to 3. Further, in Formula 14, $\theta = \tan^{-1}(1/2)$.

[Formula 10]

$$S = \frac{1}{\sqrt{6}} e^{j(k\pi/2)} \qquad \text{(Formula 10)}$$

[Formula 11]

$$S = \frac{1}{\sqrt{3}} e^{j(2k+1)\pi/4} \qquad \text{(Formula 11)}$$

[Formula 12]

$$S = \sqrt{\frac{2}{3}} e^{j(k\pi/2)} \qquad \text{(Formula 12)}$$

[Formula 13]

$$S = \sqrt{\frac{5}{6}} e^{j(k\pi/2+\theta)} \qquad \text{(Formula 13)}$$

[Formula 14]

$$S = \sqrt{\frac{5}{6}} e^{j(k\pi/2-\theta)} \qquad \text{(Formula 14)}$$

Further, when the operation using Formula 5 is performed for $X_{2m}$ and $X_{2m+1}$ given by Formula 2, in a case where any of a combination of a value (coordinates of an arbitrary one point) given by Formula 10 and a value given by Formula 13 or Formula 14, a combination of a value given by Formula 11 and a value given by Formula 12, a combination of a value given by Formula 12 and a value given by Formula 11, and a combination of a value given by Formula 13 or Formula 14 and a value given by Formula 10 is used as the combination of the initial values $S'_{-2}$ and $S'_{-1}$, the arrangement of output signals of the differential encoding unit 34a becomes a signal arrangement which deviates in 20 points shown in FIG. 15 and does not include the origin. Formula 6 corresponds to the combination of a case where k=0 in Formula 10 and a case where k=0 in Formula 13.

In such a case, the output of the space-time block encoding unit 15a at the second stage has the same signal arrangement, which may be a signal arrangement which does not include the origin.

Further, in this example, the symbol mapping units 14-1a, 14-2a, 32-1a and 32-2a perform symbol mapping based on the correspondence relationship shown in Formula 2 with respect to the respective patterns of the input bits "00", "01", "11", and "10", but the invention is not limited thereto. That is, for example, the symbol mapping units 14-1a, 14-2a, 32-1a and 32-2a may fixedly map the respective patterns of the input bits "00", "01", "11" and "10" with respect to any of four outputs X shown in FIG. 12.

Here, in this example, $S_{2m}$ and $S_{2m+1}$ may use 20 types of patterns, respectively, and combinations thereof are 400 types in all, but actually, there is a restriction shown in Formula 15.

[Formula 15]

$$|S_{2m}|^2 + |S_{2m+1}|^2 = 1 \qquad \text{(Formula 15)}$$

The number of preferable combinations is 96 types among the 400 types. Further, if the initial values of $S_{2m}$ and $S_{2m+1}$ are determined as one of 96 types, the combinations which are actually generated correspond to 24 types.

(Description about Example of Second Simulation)

Description will be made with reference to FIGS. 5 to 9.

Firstly, with respect to configurations or operations of a transmitter according to a second simulation, differences with the above-mentioned content will be described with reference to FIG. 1.

Main functions of the respective symbol mapping units 14-1a, 14-2a, 32-1a and 32-2a according to the second simulation are the same as the above-mentioned content. However, in the second simulation, different symbol modulations are respectively defined with respect to the first output ($b_{4n}$ and $b_{4n+1}$) and the second output ($b_{4n+2}$ and $b_{4n+3}$) from the S/P conversion units 13a and 31a.

The symbol mapping units 14-1a and 32-1a which form a first symbol mapping unit (symbol mapping unit A) respectively receive the first output ($b_{4n}$ and $b_{4n+1}$) from the S/P conversion units 13a and 31a at the first stage and calculates $X_{2m}$ given by Formula 7 which is the same as Formula 2 to output the result to the differential encoding units 15a and 34a at the second stage.

The symbol mapping units 14-2a and 32-2a which form a second symbol mapping unit (symbol mapping unit B) respectively receive the second output ($b_{4a+2}$, $b_{4n+3}$) from the S/P conversion units 13a and 31a at the first stage and calculates $X_{2m+1}$ given by Formula 8 to output the result to the differential encoding units 15a and 34a at the second stage. Here, Formula 8 is obtained by rotating Formula 7 by $-45°$ on the IQ plane.

[Formula 7]

$X_{2m}=1/2(1+j)$ when input bits are "00"

$X_{2m}=1/2(-1+j)$ when input bits are "01"

$X_{2m}=1/2(-1-j)$ when input bits are "11"

$X_{2m}=1/2(1-j)$ when input bits are "10" (Formula 7)

[Formula 8]

$X_{2m+1}=1/\sqrt{2}$ when input bits are "00"

$X_{2m+1}=j(1/\sqrt{2})$ when input bits are "01"

$X_{2m+1}=-1/\sqrt{2}$ when input bits are "11"

$X_{2m+1}=-j(1/\sqrt{2})$ when input bits are "10" (Formula 8)

Further, for example, in the case of the symbol mapping units 32-1a and 32-2a, the initial value storage unit 33a, and the differential encoding unit 34a, if Formula 5 is calculated using the initial values $S'_{-2}$ and $S'_{-1}$ shown in Formula 9, the arrangement of output signals of the differential encoding unit 34a becomes a signal arrangement as shown in FIG. 5.

FIG. 5 shows an example of signal arrangement of the differential encoding unit 34a. Here, coordinates S of 24 points are shown, and respective symbols are given numbers (mapping point numbers). The horizontal axis represents an in-phase (I) component, and the vertical axis represents an orthogonal (Q) component.

[Formula 9]

$$\begin{bmatrix} S'_{-2} \\ S'_{-1} \end{bmatrix} = \frac{1}{\sqrt{2}} \begin{bmatrix} 1 \\ j \end{bmatrix}$$ (Formula 9)

Specifically, in the mapping arrangement shown in FIG. 5, the numbers of [1] to [24] are assigned to the 24 output points.

According to the calculation result of Formula 5, it is confirmed that the combination of $S'_{2m+1}$ and $S'_{2m+1}$ has 24 types of combination states shown in the table of FIG. 6.

The table of FIG. 6 shows an example of the combination of signal arrangements of $S'_{2m}$ and $S'_{2m+1}$ (similar to $S_{2m}$ and $S_{2m+1}$) and corresponding state numbers (state No.). Here, if the initial values are any one of the state numbers shown in FIG. 6, it is confirmed that the deviation is performed in the same 24 points as in FIG. 5.

If it is considered that this operation is applied to the symbol mapping units 14-1a and 14-2a, the differential encoding units 15a, and the STBC encoding unit 17a, the arrangement of output signals of the differential encoding unit 15a becomes a signal arrangement as shown in FIG. 5. Further, the output of the STBC encoding unit 17a at the second stage may become the same signal arrangement.

Then, a process performed by the initial value setting unit 35a will be described in detail.

Figure 7:
FIG. 7 is a diagram illustrating an example of a table of conversion from input into output in an initial value setting unit according to the second simulation.

In the transmitter according to the second simulation, the initial value setting unit 35a calculates the initial values $S_{-2}$ and $S_{-1}$ of the differential encoding unit 15a from the output $S'_{58}$ and $S'_{59}$ from the differential encoding unit 34a (or state No.) according to the content of a table (conversion table) shown in FIG. 7 and outputs the result to the differential encoding unit 15a.

FIG. 7 shows an example of a table of conversion from input into output in the initial value setting unit 35a.

Specifically, a list of the output values $S'_{58}$ and $S'_{59}$ in the positions immediately before the sync word from the differential encoding unit 34a at the first stage and corresponding state numbers (information about the input of the initial value setting unit 35a) is shown, which is the same as the content shown in FIG. 6. Further, a list of the initial values $S_{-2}$ and $S_{-1}$ of the differential encoding unit 15a at the second stage and corresponding state numbers (information about the output of the initial value setting unit 35a) is shown. Further, if the state number of the input is determined in the initial value setting unit 35a, the output of the corresponding state number (in the conversion table of FIG. 7, "state No" in the same row) is performed. The mapping point numbers of [1] to [24] represent the same symbol values as in FIG. 5.

Here, if Formula 1 is calculated by the differential encoding unit 15a using the initial values $S_{-2}$ and $S_{-1}$ as in the example, the calculation result when m=29, that is, the combination of $S_{58}$ and $S_{59}$ immediately before the sync word necessarily corresponds to "state No. 1", and the mapping arrangement of $S_{2m}$ and $S_{2m+1}$ (m=30 to 34) of the sync word may be set to a fixed mapping pattern according to a fixed bit pattern.

FIG. 8 shows an example of a simulation result (case 2-1). In this case, since the combination of $S'_{58}$ and $S'_{59}$ which are the output values of the differential encoding unit 34a when m=29 corresponds to "state No. 16", the initial values $S_{-2}$ and $S_{-1}$ corresponding to "state No. 20" are used on the basis of the conversion table of FIG. 7.

FIG. 9 shows an example of a simulation result (case 2-2). In this case, since the combination of $S'_{58}$ and $S'_{59}$ which are the output values of the differential encoding unit 34a when m=29 corresponds to "state No. 23", the initial values $S_{-2}$ and $S_{-1}$ corresponding to "state No. 19" are used on the basis of the conversion table of FIG. 7.

Here, in the second simulation, the input up to the sync word is set to a random bit input and the sync word is set to a fixed pattern. Further, in FIGS. 8 and 9, the deviation of $S_{2m}$ and $S_{m+1}$ according to the input pattern and the transition of $S'_{2m}$ and $S'_{2m+1}$ are expressed as deviation of the state number.

The results shown in FIG. 8 and FIG. 9 are different from each other in the bit pattern of 120 bits of the random bit input, but show that the state number immediately before the sync word is 1 and the mapping pattern of the sync word is the fixed mapping pattern. Verification is completed for other input patterns as input data, and the same result is achieved.

Further, in this example, the initial value storage unit 33a outputs values shown in Formula 9 as the initial values $S'_{-2}$ and $S'_{-1}$ where m=0 to the differential encoding unit 34a for setting, but different initial values specified as described later may be used.

That is, if the respective coordinates of 24 points shown in FIG. 5 are classified with reference to the distance from the origin and the phase, they may be classified into a first group which includes eight coordinates expressed as coordinate S of Formula 16, a second group which includes eight coordinates expressed as a coordinate S of Formula 17, and a third group which includes eight coordinates expressed as a coordinate S of Formula 18. In Formula 16 to Formula 18, k is an integer of 0 to 7.

[Formula 16]

$$S=\sin(\pi/8)e^{j(2k+1)\pi/8}$$ (Formula 16)

[Formula 17]

$$S=\sin(\pi/4)e^{jk\pi/4}$$ (Formula 17)

[Formula 18]

$$S=\sin(3\pi/8)e^{j(2k+1)\pi/8}$$ (Formula 18)

Further, when the operation using Formula 5 is performed for $X_{2m}$ and $X_{2m+1}$ given by Formula 7 and Formula 8, in a case where any of a combination of a value (coordinates of an arbitrary one point) given by Formula 16 and a value given by Formula 18, a combination of a value given by Formula 17 and a value given by (Formula 17), and a combination of a value given by Formula 18 and a value given by Formula 16 is used as the combination of the initial values $S'_{-2}$ and $S'_{-1}$, the arrangement of output signals of the differential encoding unit 34a becomes a signal arrangement which deviates in 24 points shown in FIG. 5 and does not include the origin.

Here, the initial values used by the combinations of Formula 16 to Formula 18 are combinations where the phase difference of two initial values becomes nπ/2 (n is an integer). That is, the initial values are selected from combinations other than combinations where the phase difference of two initial values is 45°, 135°, 225° and 315°. Here, Formula 9 corresponds to the combination of a case where k=0 in Formula 17 and a case where k=2 in Formula 17.

In such a case, the output of the space-time block encoding unit 15a at the second stage has the same signal arrangement, which may be a signal arrangement which does not include the origin.

Here, the reason why the phase difference of the initial values is set to $n\pi/2$ will be described.

Among the combinations of Formula 16 to Formula 18, the combinations where the phase difference is $n\pi/2$ represent the combination of subsequent outputs (symbol arrangements) of the differential encoding unit 34a in addition to the initial values.

On the other hand, among the combinations of Formula 16 to Formula 18, the combinations where the phase difference is 45°, 135°, 225° and 315° are not output from the differential encoding unit 34a even though the phase difference of the initial values is set to $n\pi/2$. Further, in a case where the initial values where the phase difference is 45°, 135°, 225° and 315° are set, a subsequent output of the differential encoding unit 34a has a symbol arrangement which is not shown in the combinations of Formula 16 to Formula 18 (that is, does not have the symbol arrangement shown in FIG. 5).

Accordingly, by setting the combination so that the phase difference of two initial values is $n\pi/2$, the symbol arrangement cannot include the origin, and the output of the differential encoding unit 34a may not be limited to the symbol arrangement of 24 points shown in FIG. 5.

Further, in this example, the symbol mapping units 14-1a, 14-2a, 32-1a and 32-2a perform symbol mapping based on the correspondence relationship shown in Formula 7 and Formula 8, with respect to the respective patterns of the input bits "00", "01", "11" and "10", but the invention is not limited thereto. That is, for example, the symbol mapping units 14-1a and 32-1a which form the first symbol mapping unit (symbol mapping unit A) may fixedly map the respective patterns of the input bits "00", "01", "11" and "10" with respect to any one of four outputs $X_{2m}$ shown in Formula 7, and the symbol mapping units 14-2a and 32-2a which form the second symbol mapping unit (symbol mapping unit B) may perform fixed mapping with respect to any one of four outputs $X_{2m+1}$ shown in Formula 8 using the same correspondence relationship.

(Description about Example of Creation Method of Conversion Table)

The conversion table shown in FIG. 2 (or FIG. 7) is a table in which combinations which can be taken by two values output from the differential encoding units 34a and 34b are defined as states and state numbers are assigned to inputs (outputs $S'_{58}$ and $S'_{59}$ immediately before the sync word of the differential encoding units 34a and 34b) of the initial value setting units 35a and 35b and outputs (initial values $S'_{-2}$ and $S'_{-1}$ of the differential encoding units 15a and 15b) of the initial value setting units 35a and 35b to be matched with each other, respectively.

The conversion table shown in FIG. 2 (or FIG. 7) may be created by the following method, for example.

Figure 17:
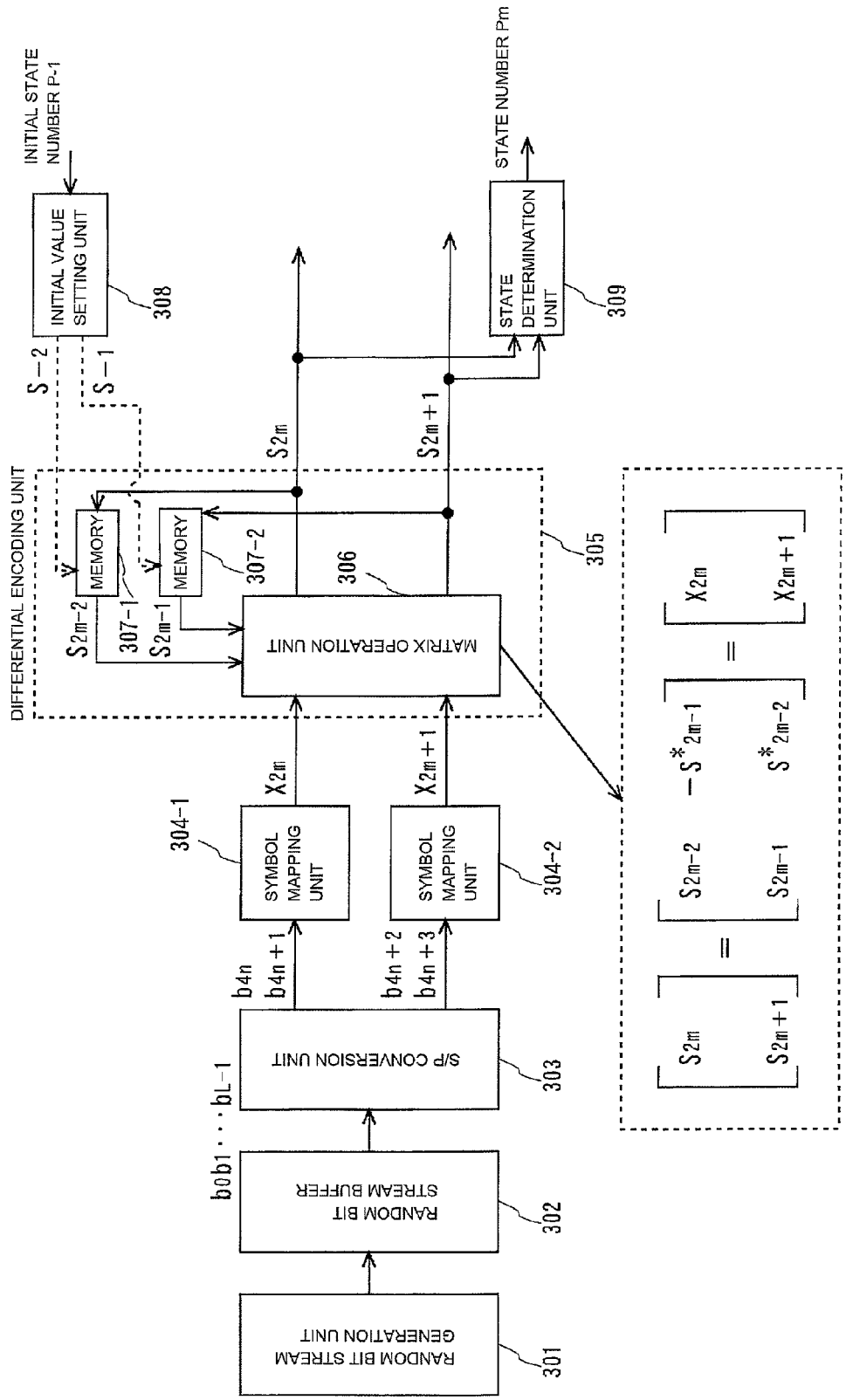
FIG. 17 is a diagram illustrating functional blocks of a differential encoding test device.

FIG. 17 is a diagram illustrating an example of functional blocks of a differential encoding test device used for creation of the conversion table, which is configured on a simulation program through software, for example.

The differential encoding test device in this example includes a random bit stream generation unit 301, a random bit stream buffer 302, an S/P conversion unit 303, two symbol mapping units 304-1 and 304-2, a differential encoding unit 305, an initial value setting unit 308, and a state determination unit 309. Further, the differential encoding unit 305 includes a matrix operation unit 306 and two memories 307-1 and 307-2.

The S/P conversion unit 303, the symbol mapping units 304-1 and 304-2, and the differential encoding unit 305 have the same functions as the S/P conversion unit 13a, the symbol mapping units 14-1a and 14-2a, and the differential encoding unit 15a in the base station 1 shown in FIG. 1, for example.

The random bit stream generation unit 301 generates a random bit stream of the length L from the head of a communication frame to a bit immediately before a sync word.

The random bit stream buffer 302 temporarily stores an output of the random bit stream generation unit 301.

The S/P conversion unit 303 converts in parallel the bit stream input from the random bit stream buffer 302 every four bits, and outputs the result as combinations of two bits. In this example, with respect to the input ($b_{4n}$, $b_{4n+1}$, $b_{4n+2}$ and $b_{4n+3}$) corresponding to four bits, the first half ($b_{4n}$, and $b_{4n+1}$) is output to the symbol mapping unit 304-1, and the second half ($b_{4n+2}$ and $b_{4n+3}$) is output to the symbol mapping unit 304-2.

The symbol mapping units 304-1 and 304-2 output complex symbol values $X_{2m}$ and $X_{2m+1}$ corresponding to 2 bits input from the S/P conversion unit 303, respectively. The correspondence relationship is based on Formula 2, Formula 7 or Formula 8, for example.

The differential encoding unit 305 performs the operation based on Formula 1 in the matrix operation unit 306 using two complex symbol values $X_{2m}$ and $X_{2m+1}$ input from the symbol mapping units 304-1 and 304-2 and immediately previous outputs ($S_{2m-2}$ and $S_{2m-1}$) of the differential encoding unit 305 stored in the memories 307-1 and 307-2, and then outputs the result. At a time m=−1, the initial values ($S_{-2}$ and $S_{-1}$) output by the initial value setting unit 308 are stored in advance in the memories 307-1 and 307-2.

The initial value setting unit 308 outputs the initial values ($S_{-2}$ and $S_{-1}$) corresponding to a predetermined initial value state number $P_{-1}$, but their correspondence relationship is shown in FIG. 6 (or FIG. 16), for example. Here, the initial state number $P_{-1}$ represents a state corresponding to the initial values stored in the memories 307-1 and 307-2 before the first bit in the random bit stream generated by the random bit stream generation unit 301 is input to the differential encoding unit 305.

The state determination unit 309 determines a corresponding state number $P_m$ from the combination ($S_{2m}$ and $S_{2m+1}$) of the outputs of the differential encoding unit 305 for output, and the correspondence relationship is as shown in FIG. 6 (or FIG. 16), for example.

In the above configuration, the length L of the random bit stream is integral multiples of 4, and when M=L/4, m=0, 1, . . . , and M−1.

Figure 18:
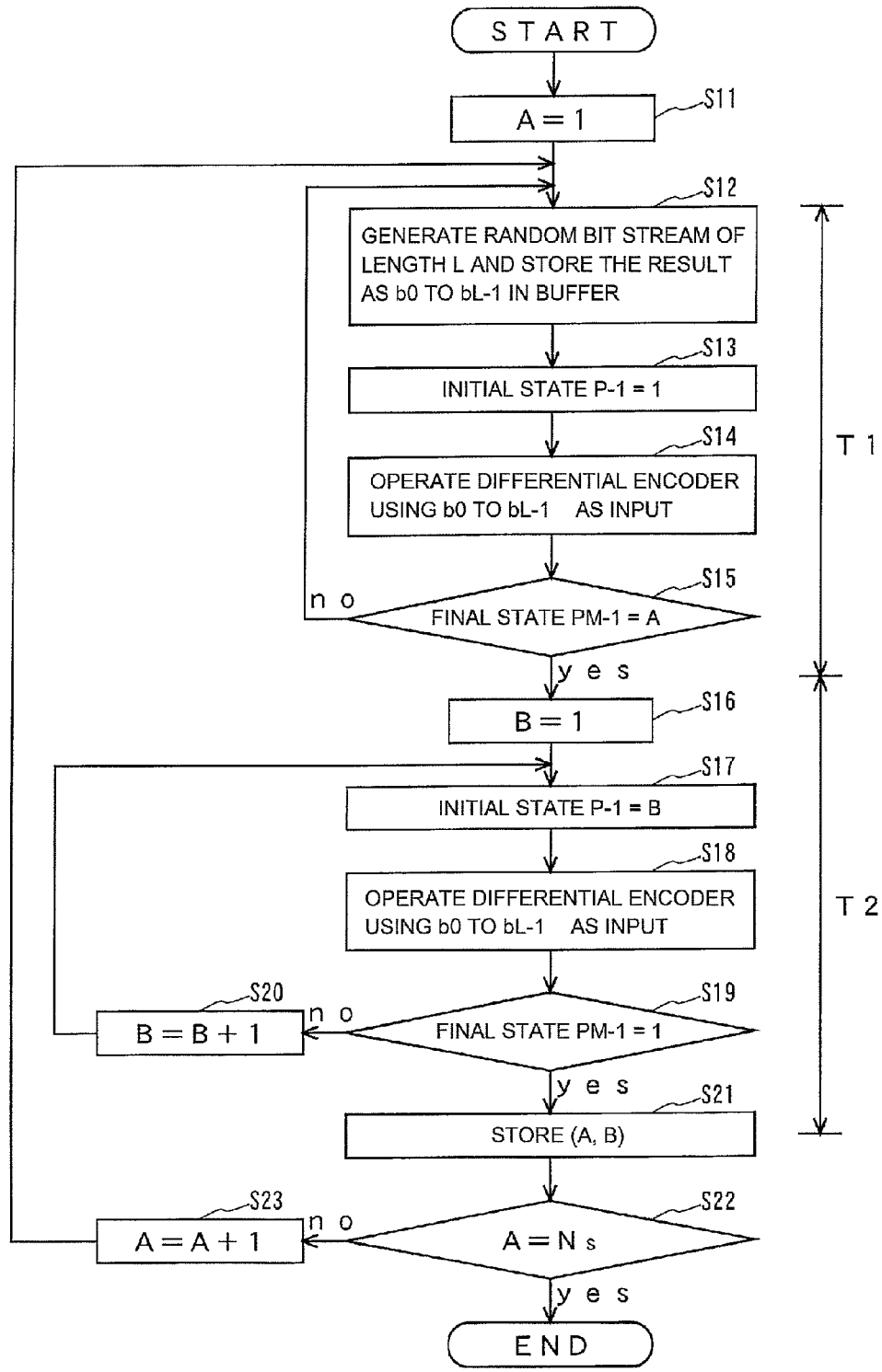
FIG. 18 is a diagram illustrating an example of a flowchart relating to creation of a conversion table.

A procedure of creating the conversion table shown in FIG. 2 (or FIG. 7) using the differential encoding test device in FIG. 17 will be described with reference to a flowchart shown in FIG. 18.

The procedure of creating the conversion table is divided into a first stage process T1 and a second stage process T2.

The first stage process T1 is a process of calculating, when the initial state number $P_{-1}$ is 1, a bit stream $b_0$ to $b_{L-1}$ (L is an input bit length) where a final state number (final state corresponding to an output which is a result obtained by inputting the final bit of the random bit stream generated by the random bit stream generation unit 302 to the differential encoding unit 305 for operation) $P_{M+1}$ becomes a state number A (=1, . . . , and Ns; Ns is the total state number). The state number A corresponds to "state No." of the left part (output immediately before the sync word of the differential encoding unit at the first stage (input of an initial value updating unit)) in the conversion table of FIG. 2 (or FIG. 7).

Specifically, for example, A which is a state number and a variable is set to "1" (step S11), and then, the following processes are performed.

That is, the random bit stream $b_0$ to $b_{L-1}$ is generated by means for random number generation or the like in the random bit stream generation unit 301, and is stored in a buffer (step S12). Then, the initial state number $P_{-1}$ is set to "1" (step S13), and the differential encoding unit 305 is sequentially operated using the bit stream $b_0$ to $b_{L-1}$ as an input (step S14). As a result, in a case where the final state number $P_{M-1}$ does not become the state number A which is a target, a random bit stream $b_0$ to different from the bit stream is generated again, and the same operation is repeated (step S15). On the other hand, in a case where the final state number $P_{M-1}$ becomes the state number A which is the target, the procedure goes to the second stage process T2.

Then, the random bit stream generation unit 301 in FIG. 17 stops the operation, and the content $b_0$ to $b_{L-1}$ of the random bit stream buffer 302 is not updated but stored.

The second stage process T2 is a process of calculating a bit state number B which is the initial state number $P_{-1}$ in which the final state number $P_{M-1}$ becomes "1", using the bit stream $b_0$ to $b_{L-1}$ which is generated in the first stage process T1 and is stored in the random bit stream buffer 302 as an input. The state number B corresponds to "state No." of the right part (initial values $S_{-2}$ and $S_{-1}$ of the differential encoding unit at the second stage (output of the initial value updating unit)) in the conversion table of FIG. 2 (or FIG. 7).

That is, B which is a state number and a variable is set to "1" (step S16), the initial state number $P_{-1}$ is set to B (step S17), and the differential encoding unit 305 is sequentially operated using the bit stream $b_0$ to $b_{L-1}$ as an input (step S18). As a result, in a case where the final state number $P_{M-1}$ does not become "1" which is a target, the state number B is increased by one, and then, the same operation is repeated (steps S19 and S20). On the other hand, in a case where the final state number $P_{M-1}$ becomes "1" which is the target, the value of the state number B input in this process and the value of the state number A are set to (A, B) and are stored as one combination (step S21).

By repeating the operations of the above-mentioned first stage process T1 and the second stage process T2 with respect to the state number A from "1" to Ns (Ns is the total state number) (steps S22 and S23), Ns items of (A, B) combinations are obtained. This is expressed as a table, which is as shown in FIG. 2 (or FIG. 7).

Here, in the case of the bit stream in which the initial state number $P_{-1}$ is the same as the final state number $P_{M-1}$, it is possible to use the common combination of the state number A and the state number B.

Further, in the above description, as an example, the processes are performed to calculate the bit stream $b_0$ to $b_{L-1}$ in which the initial state number $P_{-1}$ is set to "1" to obtain the state number A, and to calculate the state number B in which the final state number $P_{M-1}$ becomes "1", but the initial state number $P_{-1}$ may not be started from "1", and the final state number $P_{M-1}$ may not be set to "1". That is, the initial state number $P_{-1}$ and the final state number $P_{M-1}$ may be randomly set.

Further, the values stored in the conversion table (FIG. 2 or FIG. 7) of the initial values are also appropriately changed by a mapping method of symbol mapping and the combination of the initial values. Further, the values are also appropriately changed by the combination of the initial state number and the final state number.

Conclusion of Embodiment

As described above, in the transmitter using the DSBC scheme of this example, in a case where the sync word is disposed in the predetermined position subsequent to the head of the frame, on the basis of the value (for example, bit value) before the sync word from the head of the frame, the initial values $S_{-2}$ and of the differential encoding unit when the value (frame value) is processed are set so that the signal point corresponding to the position immediately before the sync word in the mainline processes (here, processes of the S/P conversion unit 13a to the STBC encoding unit 17a) becomes the specific point.

Specifically, since it is generally assumed that the mapping arrangement of the sync word is known in the digital radio AFC process, the reception side calculates an error with respect to the mapping arrangement result obtained by demodulating the sync word to perform correction. However, in the related art, if the DSTBC scheme is used, since the mapping arrangement is changed depending on the input of the immediately previous data (for example, sound data), the fundamental mapping arrangement is not fixed, which demanded a solution. Thus, in this example, by operating the initial values $S_{-2}$ and $S_{-1}$ input to the differential encoding unit 15a from the data of 120 bits from the head of the frame of the received data to the position immediately before the sync word, and by setting the operation result as the initial values, it is possible to set the mapping arrangement of the sync word to a fixed mapping pattern, which is used as a reference mapping pattern for comparison.

In this way, in this example, in the radio apparatus which employs the DSTBC scheme, it is possible to set the mapping pattern (mapping arrangement) of the sync word which is not fixed depending on other input data in the related art to the fixed mapping pattern (for example, known fixed arrangement), for example, it is possible to define in advance the mapping arrangement point which becomes a reference in the AFC process on the reception side.

Here, as an example of the radio communication system to which the invention can be applied, a train radio system (for example, system as shown in FIG. 10) which is a broadcast radio system will be schematically described.

In the train radio system, for example, a plurality of base station apparatuses is installed along a track, one central apparatus distributes (transmits) a data stream S which is a transmission target to each base station apparatus at the same time, and each base station apparatus transmits a data stream signal generated from the corresponding data stream S through an antenna in a wireless manner. Further, a mobile station of the train which travels on the track receives a wireless signal (electric waves) from the base station apparatuses. Each base station apparatus includes two antennas including directional antennas having different radio communication areas (which may be overlapped), for example.

In such a system, in the related art, when the system is to be managed by the plurality of base station apparatuses which uses the same frequency, radio wave interference occurs in the overlapped area in the communication areas (radio communication areas) of the adjacent base station apparatuses.

Thus, as a configuration example, in each base station apparatus, a technique is considered in which a transmission signal is encoded using the DSTBC, and a transmission data stream is selected or set for each antenna of each base station apparatus so that different encoded streams which are orthogonal to each other (for example, data streams A and B which are orthogonal to each other, generated by the DSTBC scheme from the data stream S) are transmitted from each base station apparatus with respect to the overlapped area of the adjacent base station apparatuses, to thereby prevent the same wave interference.

The invention will be conceptually described.

The invention is based on the following new viewpoint, and is applied to differential encoding of a signal in the transmitter to realize effective communication.

1) In the DSTBC encoding scheme, the encoding result obtained by differential encoding of signal values by predetermined operation formulas using predetermined initial values is classified into finite numbers even though the signal values correspond to signal values of any bit stream. That is, since the encoding result of all the signal values is classified into a finite number of states, all the signal values may be represented as a finite number of signal values.

2) Further, if initial values are known in which the encoding result obtained by performing differential encoding for the finite number of signal values by the same predetermined operation formulas corresponds to predetermined target values, it is possible to use the encoding result as the predetermined target values with respect to arbitrary signal values, and thus, it is possible to obtain a target encoding result by the DSTBC encoding.

That is, referring to FIG. 2 as an example, if differential encoding is performed for all signal bit streams by the predetermined operation formulas (for example, Formula 2 and Formula 5) using predetermined initial values (for example, Formula 6), the encoding result is classified into 24 types of states (left part in FIG. 2). Further, for each of the 24 types of classifications, if the initial values are calculated in which the target encoding result can be obtained with respect to certain signal values relating to the classification by performing differential encoding for the signal values, the initial values are matched with any one of the 24 types of states (right part in FIG. 2).

Accordingly, in the DSTBC encoding scheme, in the first stage encoding process, by specifying, on the basis of the encoding result obtained by performing differential encoding for the signal values from the head of the frame to the position immediately before the sync word, the initial values (right part in FIG. 2) corresponding to the encoding result (left part in FIG. 2), and by performing the encoding process of the entire frame using the specified initial values as initial values in the second stage encoding, it is possible to (constantly) obtain a predetermined target encoding result with respect to the sync word part of the frame.

That is, the invention may be understood as a transmitter (or transmission method) which performs differential encoding for signals of the frame unit for transmission using the fact that the encoding result obtained by performing differential encoding for the signal values by the predetermined operation formulas using the predetermined initial values is classified into a finite number, in which the correspondence relationship (table) between the encoding result of the finite number and the initial values in which the encoding result obtained by performing differential encoding for the signal values which are the encoding result of the finite number by the predetermined operation formulas is a predetermined target value is prepared, and in the first stage encoding process, on the basis of the encoding result obtained by performing differential encoding for the signal values from the head of the frame to the position immediately before the sync word by the predetermined operation formulas using the predetermined initial values, the initial values which are matched with the encoding result are specified from the relationship (table), and in the second stage encoding process, the frame is encoded by the predetermined operation formulas using the specified initial values.

Here, the system, apparatus or the like according to the invention is not necessarily limited to the above-described configuration, and may have various configurations. Further, the present invention may be provided as a method or technique which performs the processes according to the present invention, a program for realizing the method or technique, a recording medium which records the program, or the like. Further, the invention may be provided as various systems or apparatuses.

Further, the invention is not necessarily limited to the above-described application, and may be applied to various applications.

Further, in the various processes performed in the system, apparatus or the like according to the invention, a configuration may be used in which control is performed as a processor executes a control program stored in a ROM (Read Only Memory), in a hardware resource including the processor, the memory and the like. Further, for example, the respective function means for performing the processes may be configured as independent hardware circuits.

Further, the invention may be understood as a computer-readable recording medium such as a Floppy (registered trademark) disc or a CD (Compact Disc) ROM which stores the control program, or the program (itself). Further, the processes according to the invention may be performed by inputting the control program into a computer from the recording medium to be executed by the processor.

DESCRIPTION OF REFERENCE NUMERALS AND SIGNS 1, 2, 111, 112, 201, 202 BASE STATION APPARATUS
11a, b, 211a, b INPUT UNIT
12a, b, 212a, b CHANNEL CODING UNIT
13a,b, 31a, b, 213a, b S/P CONVERSION UNIT
14-1a, b, 14-2a,b, 32-1a, b, 32-2a, b, 214-1a, b, 214-2a, b SYMBOL MAPPING UNIT
15a, b, 34a, b, 216a,b DIFFERENTIAL ENCODING UNIT
16a, b, 217a,b BASE STATION ID NOTIFICATION UNIT
17a, b, 218a, b STBC ENCODING UNIT
18a, b, 219a, b TRANSMISSION UNIT
19a, b, 220a, b POWER AMPLIFIER
20a, b, 221a, b TRANSMISSION ANTENNA
33a, b, 215a, b INITIAL VALUE STORAGE UNIT
35a, b INITIAL VALUE SETTING UNIT
101 CENTRAL DESK
102 CENTRAL APPARATUS
121 MOBILE STATION APPARATUS

The invention claimed is:

1. A transmitter which transmits a signal by a DSTBC scheme, comprising:
a first differential encoding means for performing differential encoding for values from the head of a frame to a position immediately before a sync word using predetermined initial values;
an initial value setting means for setting initial values on the basis of the differential encoding result immediately before the sync word obtained by the first differential encoding means; and
a second differential encoding means for performing differential encoding for the frame as a transmission target using the initial values set by the initial value setting means.

2. The transmitter according to claim 1,
wherein the initial value setting means includes a table in which the initial values are set corresponding to the differential encoding result immediately before the sync word possibly obtained when the differential encoding is performed for the values from the head of the frame to the position immediately before the sync word, and sets the initial values used for the differential encoding of the second differential encoding means according to the differential encoding result immediately before the sync word obtained by the first differential encoding means and the table.

3. A transmission method of transmitting a signal by a DSTBC scheme, comprising:

performing differential encoding for values from the head of a frame to a position immediately before a sync word using predetermined initial values;

setting initial values used for differential encoding for the frame as a transmission target on the basis of the differential encoding result immediately before the sync word; and performing the differential encoding in which the frame is the transmission target using the set initial values.

4. The transmission method according to claim 3, wherein a table is provided in which the initial values are set corresponding to the differential encoding result immediately before the sync word obtained when the differential encoding is performed for the values from the head of the frame to the position immediately before the sync word, and the initial values used for the differential encoding in which the frame is the transmission target are set according to the differential encoding result immediately before the sync word and the table.

5. An initial value table creating method used in a DSTBC scheme in which differential encoding is performed for values from the head of a frame to a position immediately before a sync word using predetermined initial values, initial values are set on the basis of the differential encoding result immediately before the sync word obtained in the differential encoding and an initial value table, and differential encoding for the frame as a transmission target is performed using the set initial values, the method comprising:

a first step of generating a random bit stream;

a second step of performing differential encoding for the generated bit stream;

a third step of setting, when a final output obtained when the differential encoding is performed in the second step is predetermined first values, the initial values of the differential encoding to arbitrary second values;

a fourth step of performing differential encoding for the generated bit stream using the set second values as initial values; and a fifth step of storing, when a final output obtained when the differential encoding is performed in the fourth step is predetermined third values, the third values as initial values used when the differential encoding result immediately before the sync word is the first values, wherein when the final output obtained when the differential encoding is performed in the second step is not the first values, the method includes returning to the first step, and wherein when the final output obtained when the differential encoding is performed in the fourth step is not the third values, the method includes setting the second values as different values and returning to the fourth step.

* * * * *